US012669284B2

(12) United States Patent
Tong et al.

(10) Patent No.: US 12,669,284 B2
(45) Date of Patent: Jun. 30, 2026

(54) DRYING DEVICES INCLUDING A ROTATABLE INTERIOR CONTAINER

(71) Applicant: Lagom Kitchen Co., Los Angeles, CA (US)

(72) Inventors: David Shark Tong, San Diego, CA (US); Jahaan Saini, Culver City, CA (US)

(73) Assignee: Lagom Kitchen Co., Los Angeles, CA (US)

( * ) Notice: Subject to any disclaimer, the term of this patent is extended or adjusted under 35 U.S.C. 154(b) by 547 days.

(21) Appl. No.: 18/213,552

(22) Filed: Jun. 23, 2023

(65) Prior Publication Data

US 2024/0426549 A1      Dec. 26, 2024

(51) Int. Cl.
*F26B 5/08* (2006.01)
*A47J 43/24* (2006.01)
(52) U.S. Cl.
CPC ................. *F26B 5/08* (2013.01); *A47J 43/24* (2013.01)
(58) Field of Classification Search
CPC .......... F26B 5/08; A47J 43/24; A23N 12/086; B04B 3/00
See application file for complete search history.

(56) References Cited

U.S. PATENT DOCUMENTS 4,065,811 A    12/1977  Pauty
4,209,916 A *  7/1980  Doyel ..................... A47J 43/24
                                              292/87

5,992,309 A    11/1999  Mulhauser et al.
6,018,883 A    2/2000  Mulhauser
D427,857 S    7/2000  Mulhauser et al.
(Continued)

FOREIGN PATENT DOCUMENTS

AU          707105 B1    7/1999
AU    2006227803 A1    9/2006
(Continued)

OTHER PUBLICATIONS

Amazon.com_Farberware Easy to use pro Pump Spinner with Bowl, Colander and Built in draining System for Fresh, Crisp, Clean Salad and Produce, Large 6.6 quart, Green.
(Continued)

*Primary Examiner* — Jessica Yuen
(74) *Attorney, Agent, or Firm* — Banner & Witcoff, Ltd.

(57)                ABSTRACT

Food drying devices (e.g., salad spinners) include an outer housing and a perforated inner container rotatably supported within the outer housing. An inner cover closes the inner container, and this inner cover includes a first part of a rotation producing system that rotates the inner container with respect to the outer housing. An outer cover closes the outer housing. The outer cover includes two support regions, each having an opening. A rotation mechanism includes a base portion extending through one support region opening and a second part of the rotation producing system (which engages the first part). A switch device includes a button extending through the other support region opening of the outer cover. Pressing this button moves a braking surface to engage and stop the inner cover, and sliding this button moves a lock member to engage and switch the rotation mechanism between locked and unlocked configurations.

20 Claims, 13 Drawing Sheets

(56) References Cited

U.S. PATENT DOCUMENTS

| | | | |
|---|---|---|---|
| D462,881 | S | 9/2002 | Mulhauser et al. |
| 7,121,415 | B1 | 10/2006 | Vizcarra et al. |
| 7,448,315 | B2 | 11/2008 | Mulhauser et al. |
| 7,448,660 | B2 | 11/2008 | Yamanaka et al. |
| 7,469,848 | B2 | 12/2008 | Yamanaka et al. |
| 7,549,227 | B2 | 6/2009 | De Blasis et al. |
| 7,621,213 | B2 | 11/2009 | Wong |
| 7,744,026 | B2 | 6/2010 | Gregory et al. |
| 8,117,685 | B2 | 2/2012 | Escobar et al. |
| 8,197,118 | B2 | 6/2012 | Hudson et al. |
| 8,286,355 | B2 | 10/2012 | Aby-Eva et al. |
| D682,048 | S | 5/2013 | Perry et al. |
| 8,539,693 | B2 | 9/2013 | Perry et al. |
| D804,917 | S | 12/2017 | Treacy et al. |
| 9,839,325 | B2 | 12/2017 | Repp et al. |
| 9,840,356 | B1 | 12/2017 | Spruce |
| D829,062 | S | 9/2018 | O'Leary et al. |
| D881,659 | S | 4/2020 | O'Leary et al. |
| 10,759,573 | B1 | 9/2020 | Kim et al. |
| 10,842,323 | B2 | 11/2020 | Rodgers |
| 2006/0207441 | A1 | 9/2006 | Mulhauser et al. |
| 2007/0006742 | A1 | 1/2007 | Paradise et al. |
| 2008/0073241 | A1 | 3/2008 | Naden et al. |
| 2009/0114104 | A1 | 5/2009 | Sawhney et al. |
| 2012/0246959 | A1 | 10/2012 | Perry et al. |
| 2014/0261018 | A1 | 9/2014 | Katz et al. |
| 2014/0283692 | A1 | 9/2014 | So |
| 2021/0284398 | A1 | 9/2021 | Valderrama et al. |
| 2022/0202256 | A1 | 6/2022 | Bohn et al. |

FOREIGN PATENT DOCUMENTS

| | | | |
|---|---|---|---|
| AU | 2006227803 | B2 | 9/2009 |
| AU | 2012238110 | A1 | 8/2013 |
| AU | 2012238110 | B2 | 9/2015 |
| AU | 201714931 | S | 9/2017 |
| AU | 201714932 | S | 9/2017 |
| CA | 176520 | A | 4/1917 |
| CA | 184510 | A | 5/1918 |
| CA | 2242796 | C | 9/2000 |
| CA | 2600151 | A1 | 9/2006 |
| CA | 2600151 | C | 10/2010 |
| CA | 141648 | S | 2/2012 |
| CA | 2824998 | A1 | 10/2012 |
| CA | 2824998 | C | 7/2015 |
| CN | 1220128 | A | 6/1999 |
| CN | 1144562 | C | 4/2004 |
| CN | 101141903 | A | 3/2008 |
| CN | 100544650 | C | 9/2009 |
| CN | 301933510 | | 5/2012 |
| CN | 103391739 | A | 11/2013 |
| CN | 103391739 | B | 11/2015 |
| CN | 304459429 | S | 1/2018 |
| CN | 304545302 | | 3/2018 |
| CN | 304545303 | | 3/2018 |
| CN | 305429330 | S | 11/2019 |
| DE | 919177 | T1 | 9/1999 |
| DE | 69800100 | T2 | 11/2000 |
| DK | 919177 | T3 | 8/2000 |
| EM | 001899501-0001 | | 9/2011 |
| EM | 002538900-0001 | | 11/2014 |
| EM | 004157329-0001 | | 11/2017 |
| EM | 004157329-0002 | | 11/2017 |
| EM | 006504668-0002 | | 7/2019 |
| EM | 006504684-0002 | | 7/2019 |
| EM | 008763205-0001 | | 1/2022 |
| EM | 008763205-0002 | | 1/2022 |
| EM | 008763205-0003 | | 1/2022 |
| EM | 008794044-0001 | | 1/2022 |
| EM | 008815344-0001 | | 1/2022 |
| EM | 008815344-0002 | | 1/2022 |
| EM | 008815344-0003 | | 1/2022 |
| EP | 919177 | A1 | 6/1999 |
| EP | 919177 | B1 | 3/2000 |
| EP | 2165633 | A1 | 3/2010 |
| EP | 1964499 | B1 | 6/2011 |
| EP | 2108295 | B1 | 1/2012 |
| EP | 2690996 | B1 | 4/2016 |
| EP | 2484254 | B1 | 8/2017 |
| ES | 2147467 | T3 | 9/2000 |
| GB | 9002538900-0001 | | 9/2014 |
| GB | 9004157329-0001 | | 8/2017 |
| GB | 9004157329-0002 | | 8/2017 |
| GB | 9006504668-0001 | | 5/2019 |
| GB | 9006504668-0002 | | 5/2019 |
| GB | 9006504668-0003 | | 5/2019 |
| GB | 9006504684-0001 | | 5/2019 |
| GB | 9006504684-0002 | | 5/2019 |
| GB | 9006504684-0003 | | 5/2019 |
| GB | 6185682 | | 1/2022 |
| GB | 6185683 | | 1/2022 |
| GB | 6185684 | | 1/2022 |
| HK | 1700583-0001 | | 9/2017 |
| HK | 1701655-0001 | | 2/2018 |
| HK | 1701655-0002 | S | 2/2018 |
| HK | 1702197-0001 | | 5/2018 |
| HK | 1702204-0001 | | 5/2018 |
| IN | 238557-0001 | | 5/2012 |
| JP | 2008532696 | A | 8/2008 |
| JP | 2014509893 | A | 4/2014 |
| JP | 05745103 | B2 | 7/2015 |
| JP | D1593291 | | 12/2017 |
| JP | D1616233 | | 10/2018 |
| JP | D1616234 | | 10/2018 |
| KR | 300671830.0000 | | 12/2012 |
| KR | 2013130059 | A | 11/2013 |
| KR | 1553758 | B1 | 9/2015 |
| KR | 300948281.0000 | | 3/2018 |
| KR | 300961367.0000 | | 6/2018 |
| PT | 919177 | E | 9/2000 |
| TW | 431875 | B | 5/2001 |
| TW | 149896-0001 | | 10/2012 |
| TW | 201238663 | A | 10/2012 |
| TW | 533932 | B | 5/2016 |
| TW | 187905-0001 | | 1/2018 |
| TW | 187906-0001 | | 1/2018 |
| WO | 2006101796 | A1 | 9/2006 |
| WO | 2012134694 | A1 | 10/2012 |

OTHER PUBLICATIONS

Amazon.com_OXO Good Grips Glass Salad Spinner, Large/6.22 Quart, Clear, visited Jan. 16, 2023.
Amazon.com_ OXO Stainless Steel Salad Spinner_Home & Kitchen, visited Jan. 16, 2023.

* cited by examiner

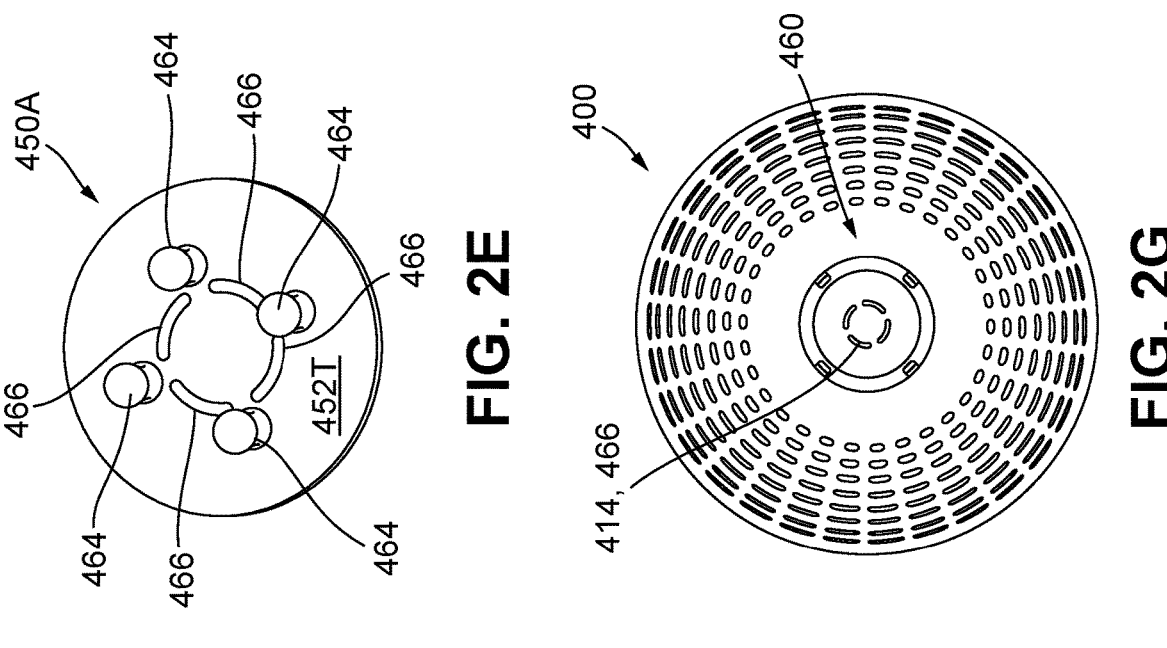
FIG. 2E
FIG. 2G
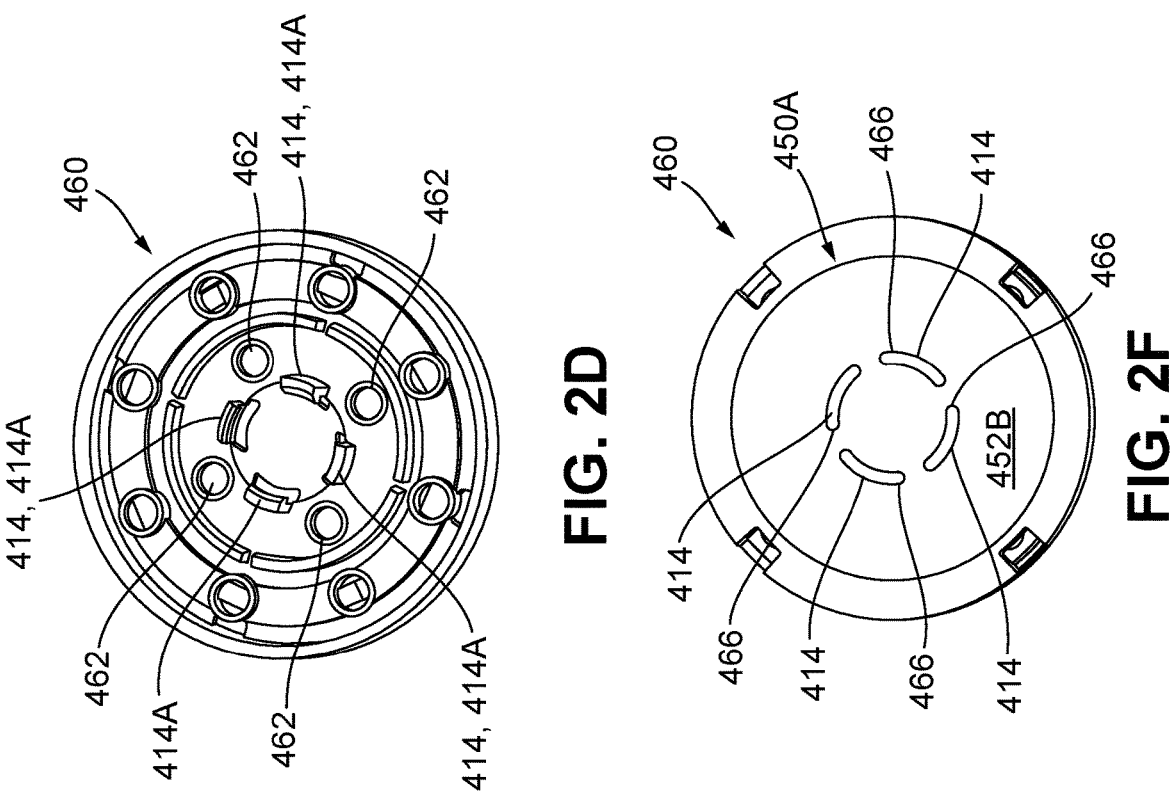
FIG. 2D
FIG. 2F

DRYING DEVICES INCLUDING A ROTATABLE INTERIOR CONTAINER

TECHNICAL FIELD

The present application relates to drying devices. Such drying devices may include two nested and relatively rotatable containers that use centrifugal force to rotate and dry a material contained within the inner nested container. Such drying devices may be used, for example, for drying foods, such as salads (e.g., salad spinners).

DESCRIPTION OF THE RELATED ART

Food preparation often involves cleaning food with water and/or the need to dry foodstuff during food preparation. Conventional kitchen colanders typically are used to help drain water or other liquid from food. In some instances, however, a simple gravity drain (using a colander) will not sufficiently dry the food, resulting in a soggy and undesirable product.

Drying devices, such as salad spinners, have been developed for drying foodstuff. Typical salad spinners include a container for holding wet salad, and this container will be rotated quickly to force water away from the salad using centrifugal force. Such salad spinners typically include multiple parts, may be slow to stop, and/or may be somewhat cumbersome and inefficient to use.

SUMMARY OF THE INVENTION

This Summary is provided to introduce some general concepts relating to this technology in a simplified form that are further described below in the Detailed Description. This Summary is not intended to identify key features or essential features of the invention.

As noted above, the present technology relates to drying devices, such as food drying devices (e.g., salad spinners). Such drying devices may include two nested and relatively rotatable containers, e.g., an outer housing and a perforated inner container. Relative rotation of the inner container with respect to the outer container causes fluid contained on a substrate (e.g., a food material, such as salad) located within the inner container to move outward under centrifugal force, through the perforations in the inner container, and into the outer container, thereby producing a dried (or drier) substrate within the perforated inner container.

At least some examples of such drying devices may include an outer housing and a perforated inner container rotatably supported within the outer housing. An inner cover may close the inner container, and this inner cover or a portion of the inner container may include a first part of a rotation producing system that rotates the inner container with respect to the outer housing. An outer cover closes the outer housing. The outer cover may include two support regions, each having an opening. A rotation mechanism may include: (i) a base portion extending through one support region opening and (ii) a second part of the rotation producing system (which engages the first part provided on the inner cover or on the inner container). A switch device may include a button extending through the other support region opening of the outer cover. This switch device may have a dual function. Specifically: (a) pressing this button may move a braking surface to engage, slow, and stop the inner cover and/or inner container from spinning with respect to the outer housing, and (b) sliding this button may move a lock member to engage or disengage from the rotation mechanism and switch it between a locked configuration and an unlocked configuration.

Drying devices (e.g., food drying devices, such as salad spinners) according to at least some aspects of this technology include:

(a) an outer housing including a first open top and defining a first interior chamber;

(b) an inner container rotatably supported within the first interior chamber, the inner container including a perforated container wall and defining an inner container chamber;

(c) an outer cover member closing the first open top, the outer cover member including: (i) a first support region having a first opening defined therethrough, and (ii) a second support region having a second opening defined therethrough;

(d) a rotation mechanism configured to apply a rotational force to rotate the inner container with respect to the outer housing, the rotation mechanism including a portion (e.g., a sidewall) extending through the first opening of the outer cover member; and (e) a switch device including: (i) a button member having a portion (e.g., a shaft or sidewall) extending through the second opening of the outer cover member, (ii) a braking surface movable by a pressing force applied to the button member to apply a braking force to the inner container, and (iii) a lock member extending laterally in a direction away from the button member (e.g., away from the portion extending through the second opening), the lock member being movable by a sliding force applied to the button member to switch the rotation mechanism between a locked configuration in which the lock member prevents activation of the rotation mechanism and an unlocked configuration in which the lock member permits activation of the rotation mechanism.

The rotation mechanism may apply rotational force directly to the inner container (e.g., if the inner container includes a part of the rotation producing system that engages a part of the rotation producing system included with the rotation mechanism). Alternatively, an inner cover member may be releasably fixed to the inner container, and the rotation mechanism may apply rotational force to this inner cover member (which in turn applies the rotational force to the inner container). Additionally or alternatively, the switch device may apply the braking force directly to the inner container (e.g., if the inner container includes a surface engagable by the braking surface of the switch device). Alternatively, an inner cover member may be releasably fixed to the inner container, and the button member may apply braking force to this inner cover member (which in turn applies the braking force to the inner container). Thus, rotational force and/or braking force may be applied directly to the inner container or indirectly to the inner container (e.g., through an inner cover member and/or through another component part).

At least some drying devices (e.g., food drying devices, such as salad spinners) in accordance with aspects of this technology include:

(a) an outer housing including a first open top and defining a first interior chamber;

(b) an inner container rotatably supported within the first interior chamber, the inner container including a perforated container wall and a second open top and defining a second interior chamber;

(c) an inner cover member closing the second open top, the inner cover member including a first part of a rotation producing system used to rotate the inner container with respect to the outer housing;

(d) an outer cover member closing the first open top, the outer cover member including: (i) a first support region having a first opening defined therethrough, and (ii) a second support region having a second opening defined therethrough;

(e) a rotation mechanism including: (i) a base portion extending through the first opening of the outer cover member, the base portion including a side surface having a recess defined therein, and (ii) a second part of the rotation producing system engagable with the first part of the rotation producing system; and (f) a switch device including: (i) a button member having a portion (e.g., a shaft or sidewall) extending through the second opening of the outer cover member, (ii) a braking surface movable by a pressing force applied to the button member to engage the inner cover member, and (iii) a lock member extending laterally in a direction away from the button member (e.g., away from the portion extending through the second opening), the lock member being movable by a sliding force applied to the button member to switch the rotation mechanism between a locked configuration in which the lock member extends into the recess defined in the base portion of the rotating mechanism and an unlocked configuration in which the lock member is located outside of the recess.

As some further examples, at least some drying devices (e.g., food drying devices, such as salad spinners) in accordance with aspects of this technology include:

(a) an outer housing including a bottom surface, at least one sidewall extending from the bottom surface, and a first open top, the outer housing defining a first interior chamber;

(b) an inner container releasably and rotatably supported by the bottom surface of the outer housing and received within the first interior chamber, the inner container including: (i) a container wall spaced inward from and rotatable within the at least one sidewall of the outer housing, the container wall having a plurality of holes extending therethrough, and (ii) a second open top, wherein the inner container defines a second interior chamber;

(c) an inner cover member releasably engaging and closing the second open top, the inner cover member including a first part of a rotation producing system used to rotate the inner container with respect to the outer housing;

(d) an outer cover member releasably engaging and closing the first open top, the outer cover member including: (i) a first support region having a first opening defined therethrough, and (ii) a second support region having a second opening defined therethrough;

(e) a rotation mechanism including: (i) a base portion extending through the first opening of the outer cover member, the base portion including a side surface having a recess defined therein, and (ii) a second part of the rotation producing system engagable with the first part of the rotation producing system; and (f) a switch device including: (i) a button member having a portion (e.g., a shaft or sidewall) extending through the second opening of the outer cover member, (ii) a braking surface movable by a pressing force applied to the button member to engage the inner cover member, and (iii) a lock member extending laterally in a direction away from the button member (e.g., away from the portion extending through the second opening), the lock member being movable by a sliding force applied to the button member to switch the rotation mechanism between a locked configuration in which the lock member extends into the recess defined in the base portion of the rotation mechanism and an unlocked configuration in which the lock member is located outside of the recess.

Additional aspects of this technology relate to methods of making drying devices of the types described above (and described in more detail below) as well as to methods of using drying devices of the types described above (and described in more detail below), e.g., for drying items placed in the inner container (such as foodstuff, like salads).

BRIEF DESCRIPTION OF DRAWINGS

The foregoing Summary, as well as the following Detailed Description, will be better understood when considered in conjunction with the accompanying drawings in which like reference numerals refer to the same or similar elements in all of the various views in which that reference number appears.

FIGS. 2D-2G show features of an alternative bottom structure for the inner container of drying devices according to some examples of this technology.

DETAILED DESCRIPTION

In the following description of various examples of drying devices according to the present technology, reference is made to the accompanying drawings, which form a part hereof, and in which are shown by way of illustration various example structures and environments in which aspects of this technology may be practiced. It is to be understood that other structures and environments may be utilized and that structural and functional modifications may be made to the specifically described structures, functions, and methods without departing from the scope of the present disclosure.

This application and/or its claims use the adjectives, e.g., "first," "second," and the like, to identify certain components and/or features relating to this technology. These adjectives are used merely for convenience, e.g., to assist in maintaining a distinction between components and/or features of a specific system, device, or structure. Use of these adjectives should not be construed as requiring a specific order or arrangement of the components and/or features being discussed. Also, use of these specific adjectives in the specification for a specific structure does not require that the same adjective be used in the claims to refer to the same part (e.g., a component or feature referred to as the "second" in the specification may correspond to any numerical adjective used for that component or feature in the claims).

Figure 1A:
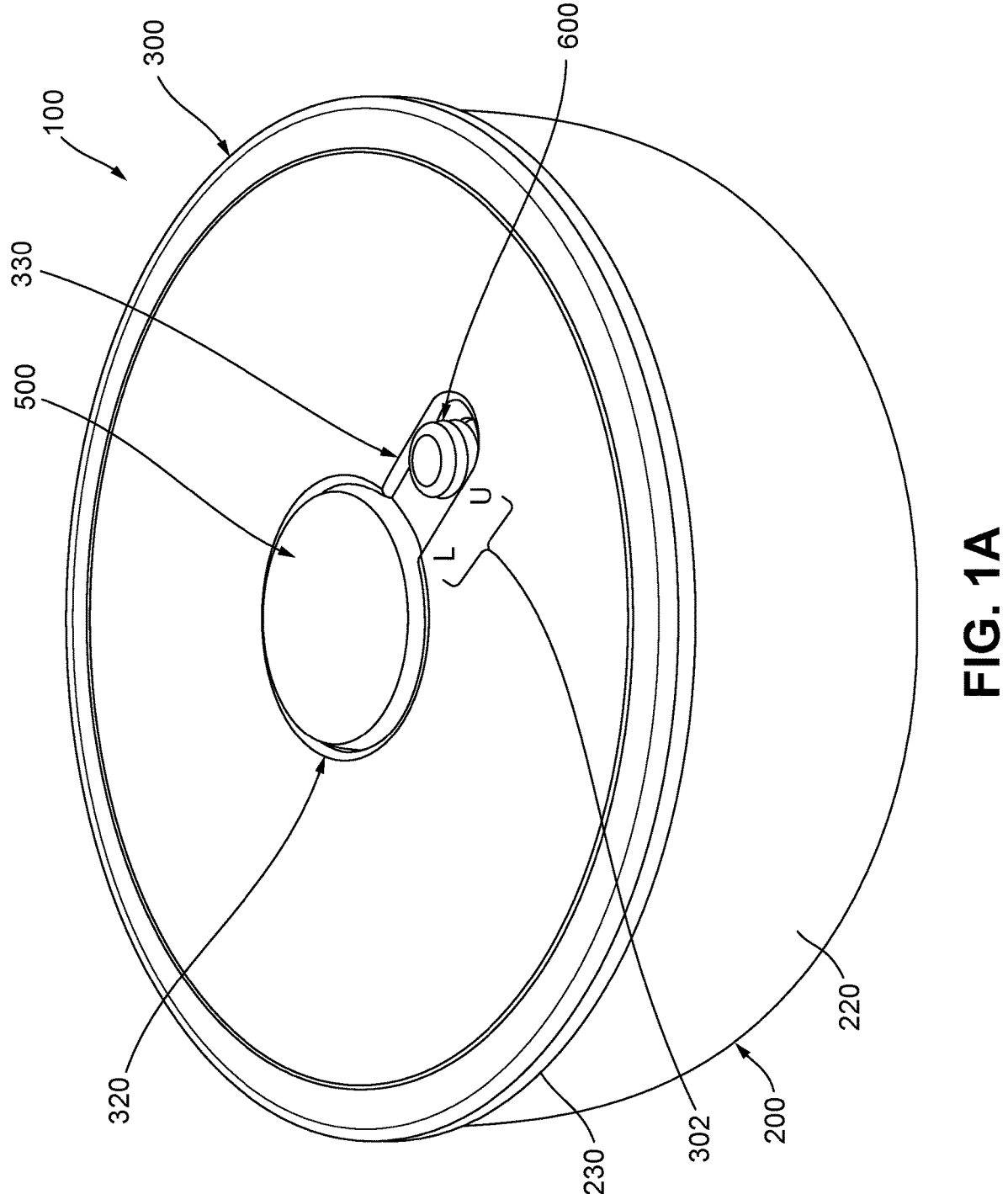
FIGS. 1A-1D provide various views of a drying device in accordance with some aspects of this technology.
Figure 1B:
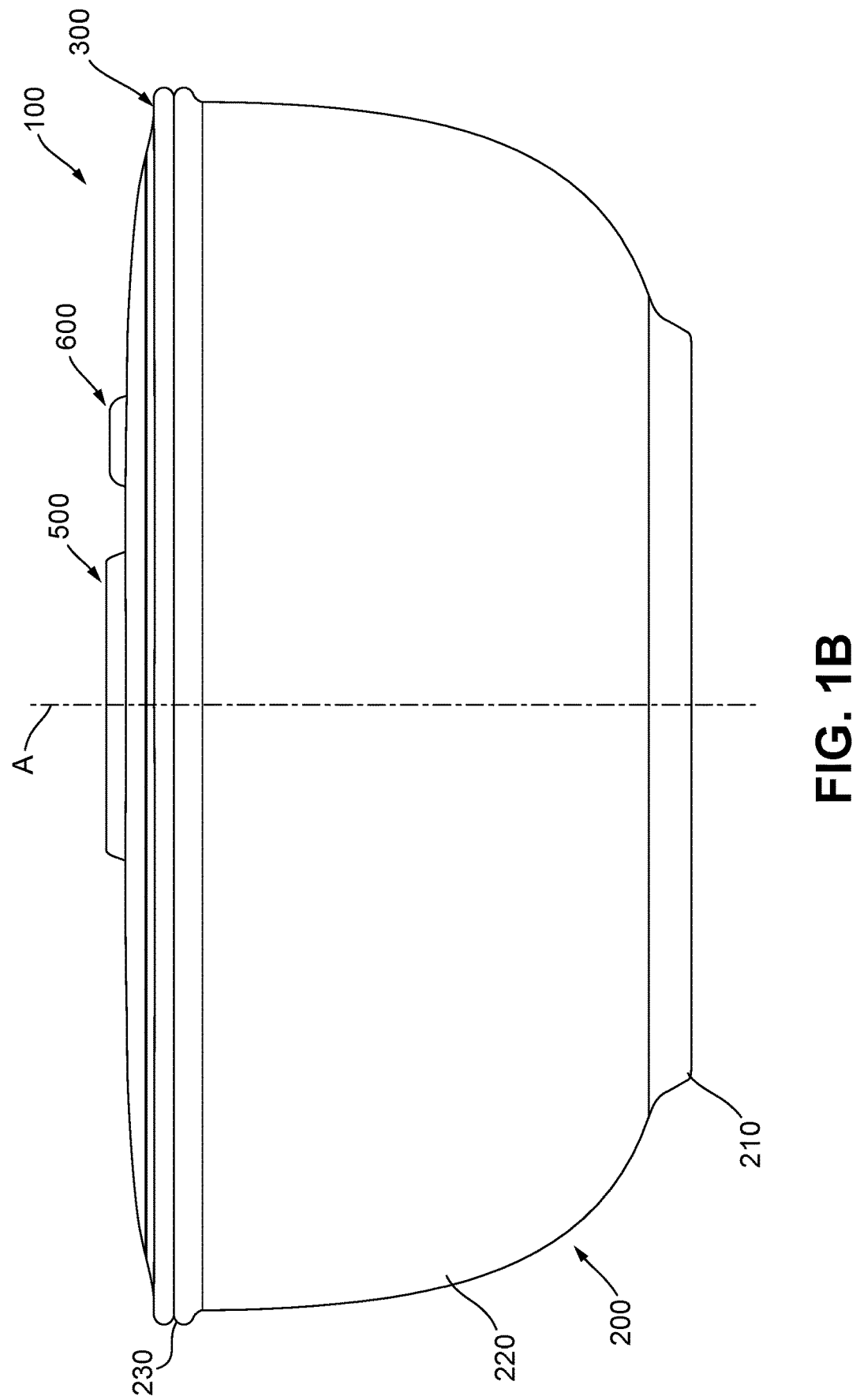
Figure 1C:
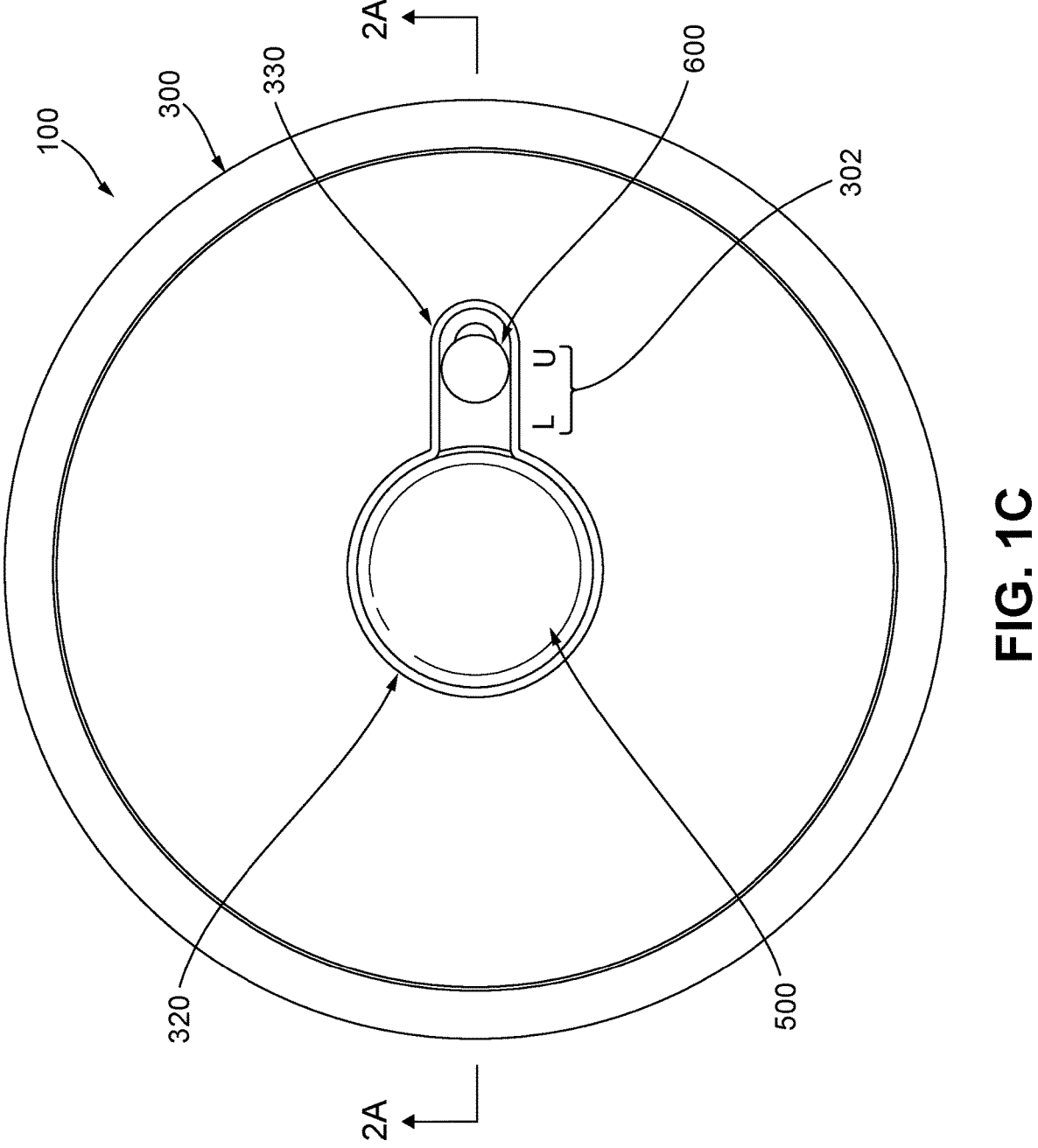
Figure 1D:
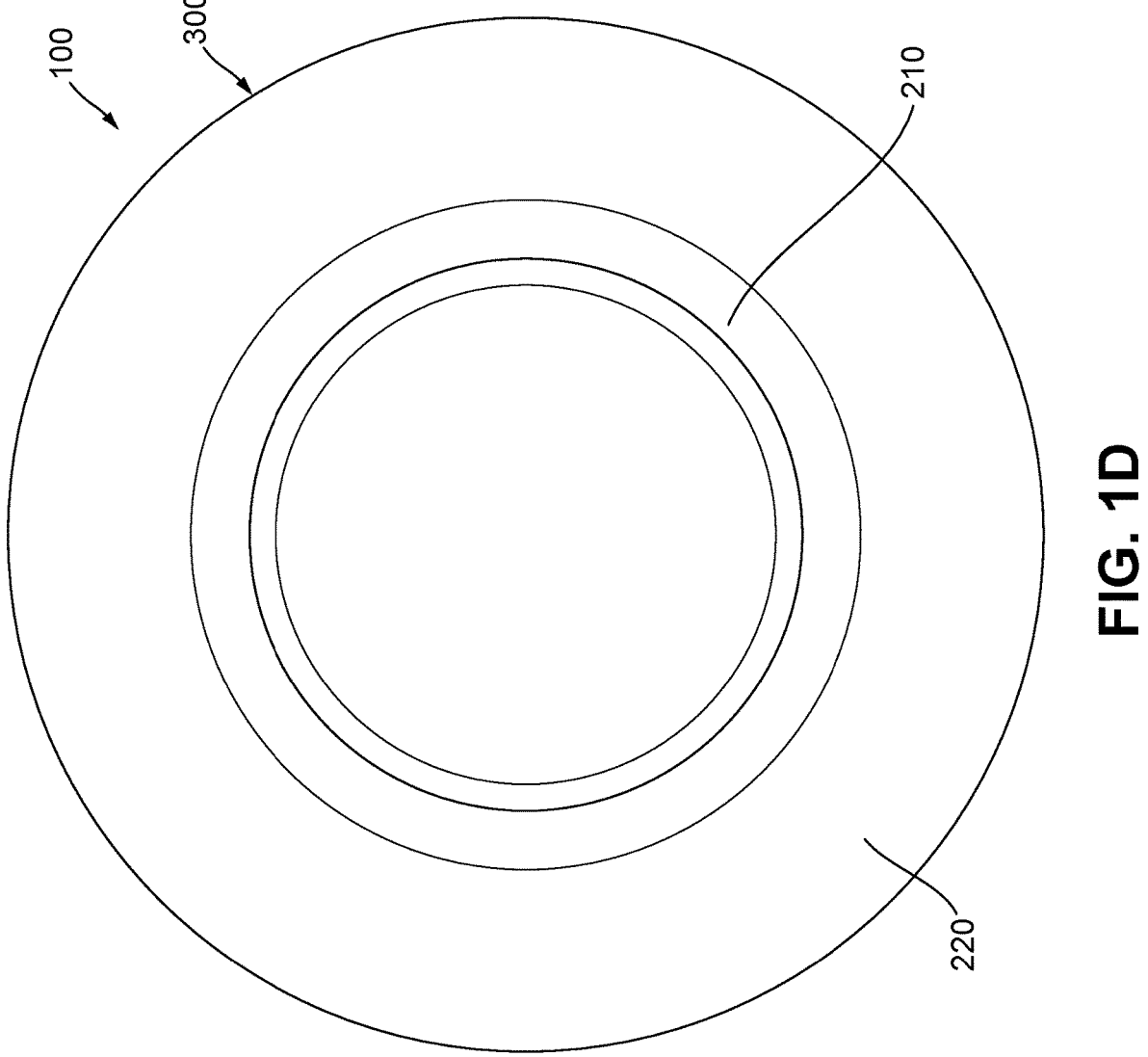
Figure 2A:
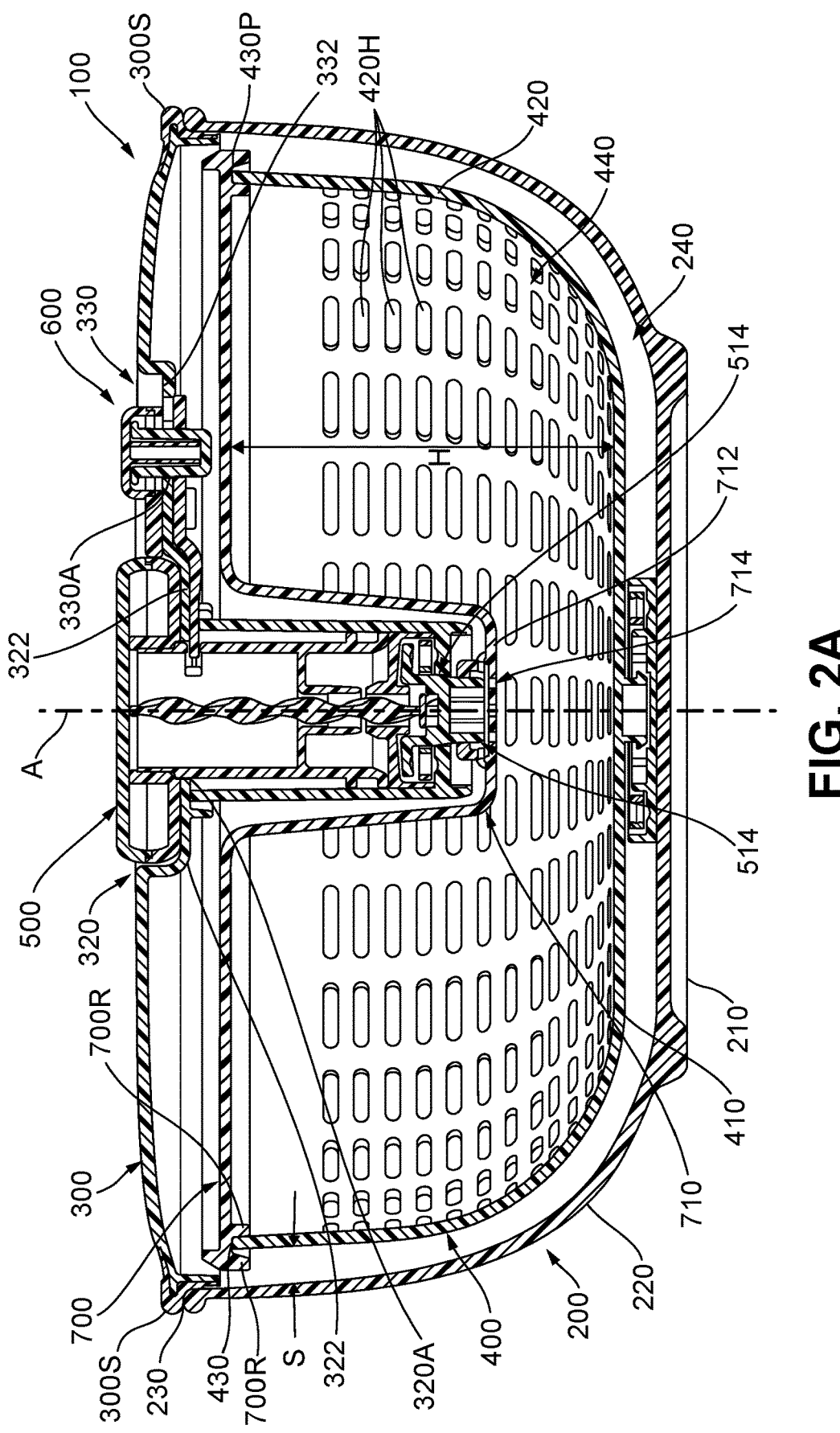
FIGS. 2A and 2B provide cross sectional views taken along line 2A-2A of FIG. 1C.

FIGS. 1A-2A provide various views of an example drying device 100 (e.g., a food drying device in the form of a salad spinner in this example) in its fully assembled configuration, i.e., in a configuration suitable for use in drying materials, such as foodstuff. FIG. 1A is a top perspective view; FIG. 1B is a front view; FIG. 1C is a top view; FIG. 1D is a bottom view; and FIG. 2A is a front sectional view taken along line 2A-2A in FIG. 1C. The drying device 100 includes an outer housing 200, which is generally an open bowl shape in the present example. The outer housing 200 includes a bottom surface 210; at least one sidewall 220 extending from the bottom surface 210 (extending outward and upward in this illustrated example); and an open top 230. The open top 230 of the outer housing 200 provides access to an interior chamber 240 defined by the outer housing 200 (see FIG. 2A). Outer housing 200 may be made of any desired material or materials, e.g., plastic, metal, etc.

The open top 230 of the outer housing 200 is closed off by an outer cover member 300 in the views shown in FIGS. 1A-1D. The outer cover member 300 of this illustrated example releasably engages the open top 230 of the outer housing 200 thereby closing the open top 230. Outer cover member 300 also may be made of any desired material or materials, e.g., plastic, metal, etc. FIG. 2A further shows that the outer cover member 300 includes a perimeter seal 300S to sealingly engage the outer cover member 300 with the open top 230 (to prevent water (or other fluid) from leaking out of the interior chamber 240). The perimeter seal 300S may be made from an elastomeric material or other suitable material.

The outer cover member 300 of this example further includes: (i) a first support region 320 having a first opening 320A (see FIG. 2A) defined therethrough, and (ii) a second support region 330 having a second opening 330A (see FIG. 2A) defined therethrough. The first support region 320 is centrally located in a center region of the outer cover member 300, e.g., centered and aligned with a central vertical axis A of the drying device 100. The central vertical axis A also corresponds to a central vertical axis of the inner container 400 (described in more detail below) and the central vertical axis of rotation of the inner container 400 (as also will be described in more detail below). The first support region 320 includes a recessed surface 322 surrounding the first opening 320A and providing an area for supporting a rotation mechanism 500 (e.g., handle 510), as also will be described in more detail below.

The second support region 330 of the outer cover member 300 is laterally offset from the first support region 320 (e.g., extends laterally sideways from the first support region 320) and may include a recessed slot 332. The second opening 330A extends through the outer cover member 300 within this recessed slot 332. The second support region 330 provides an area for supporting a switch device 600 that is: (a) movable in a vertical direction (e.g., to apply a braking force to slow and stop relative rotation) and (b) movable in a lateral direction (e.g., to switch the rotation mechanism 500 between a locked configuration and an unlocked configuration), as will be described in more detail below. The outer cover member 300 further includes switch status indicia 302 at or near the second support region 330 to indicate whether the switch device 600 is in the locked configuration (e.g., denoted by letter "L" in FIGS. 1A and 1C) and an unlocked configuration (e.g., denoted by letter "U" in FIGS. 1A and 1C).

Figures 3A, 3B:
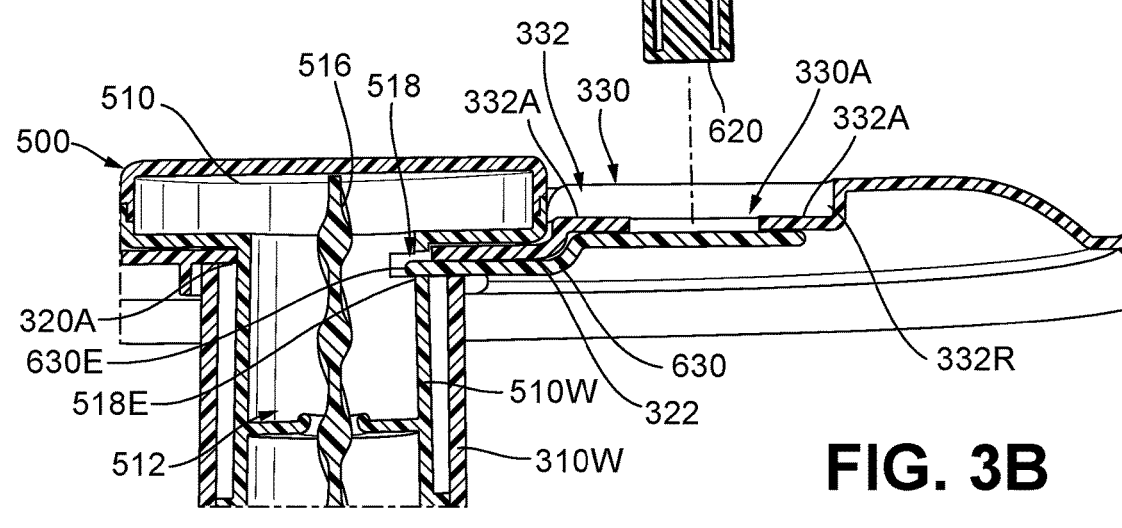
FIGS. 3A-3C provide various views showing features of a switch device in accordance with some aspects of this technology.
Figure 3C:
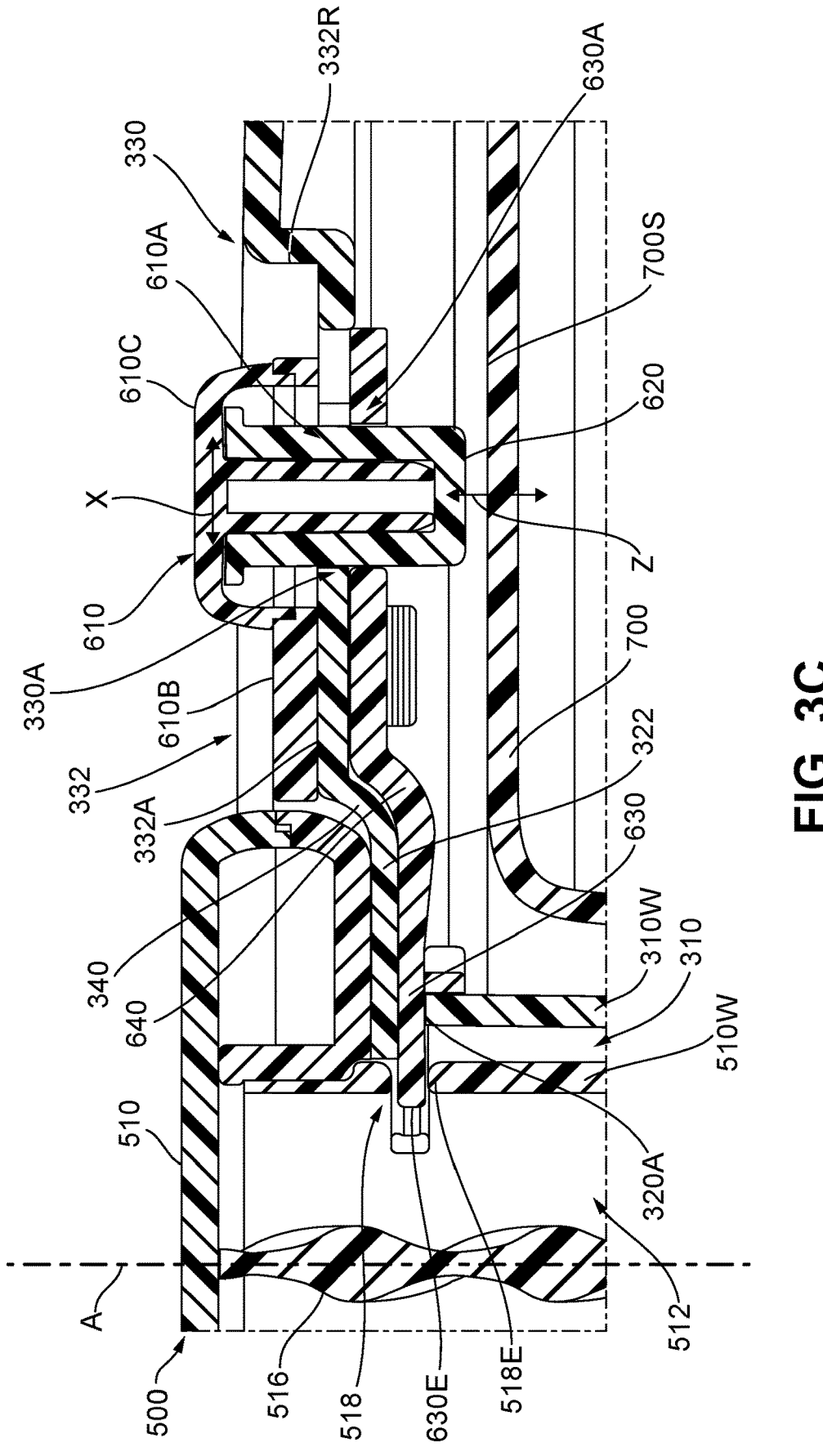

In at least some examples of this technology, as also shown in FIG. 3C (and FIGS. 4A and 4B), the first support region 320 and the second support region 330 will directly connect to one another and continuously extend between one another. For example, recessed surface 322 of the first support region 320 may extend upward from the location where it engages pump handle 510 (see area 340 in FIG. 3C) and from there directly extend into and form the top surface 332A of recessed slot 332 of the second support region 330. A portion of the switch device 600 (e.g., extending portions 610B) are located above (and optionally rest atop) top surface 332A of recessed slot 332. In this manner, the second support region 330 of the outer cover member 300 is laterally and vertically offset from the first support region 320 (e.g., the second support region 330 extends laterally sideways from the first support region 320 and is stepped upward from the first support region).

As noted above, the open top 230 of the outer housing 200 provides access to interior chamber 240 defined by the outer housing 200. As shown in FIG. 2A, an inner container 400 is received in this interior chamber 240. This inner container 400 may be releasably and rotatably supported by the bottom surface 210 of the outer housing 200 and may fit completely within the interior chamber 240. Thus, when the outer cover member 300 is placed on the outer housing 200, the inner container 400 will be enclosed within the outer housing 200 (e.g., such that the inner container 400 is nested within the outer housing 200). The inner container 400 also may be made of any desired material or materials, e.g., plastic, metal, etc.

The inner container 400 of this example includes a bottom surface 410 and at least one inner container wall 420 extending from the bottom surface 410 (extending outward and upward in this illustrated example). The inner container wall 420 is spaced inward from and rotatable within the sidewall(s) 220 of the outer housing 200. Thus, the inner surface of the sidewall 220 of the outer housing 200 will be spaced apart a distance "S" from the outer surface of the container wall 420 of the inner container 400 to provide room for relative rotation of the inner container 400 with respect to the outer housing 200. While the distance "S" may vary over the volume of the interior chamber 240, in at least some examples of this technology, the distance "S" (i.e., the shortest direct line distance between the inner surface of the sidewall 220 and the outer surface of the container wall 420) will be at least 5 mm over at least 50% of an exterior surface area of the inner container 400 (and in some examples, at least 10 mm, at least 12 mm, at least 15 mm, between 5 mm and 50 mm, between 5 mm and 35 mm, between 5 mm and 25 mm, between 10 mm and 50 mm, between 10 mm and 35 mm, and/or between 10 mm and 25 mm over at least 50% of an exterior surface area of the inner container 400). Additionally or alternatively, in some examples of this technology, any of the above size ranges for "S" may be present over at least 60%, at least 75%, at least 80%, at least 90%, or even at least 95% of the exterior surface area of the inner container 400.

The container wall 420 and/or bottom surface 410 includes a plurality of holes 420H extending through it (e.g., having a structure like a colander or other type of strainer). While shown as elongated slots formed in discernible rows and columns in FIG. 2A, the holes 420H may have any desired size, shape, spacing, and/or arrangement without departing from this technology. Further, the holes 420H may take up any desired percentage of the overall surface area of the container wall 420 and/or bottom surface 410 without departing from this technology, e.g., including at least 30%, at least 40%, at least 50%, at least 60%, or even at least 75% of the overall exterior surface area of the inner container 400. The inner container 400 further includes an open top 430 that provides access to an interior chamber 440 defined by the inner container 400. The interior chamber 440 is configured to hold the material (e.g., foodstuff, such as salad) to be dried. As the inner container 400 spins, the rotational force generated dislodges water or other fluid from material held within interior chamber 440. The water or other fluid passes through the holes 420H into the interior chamber 240 defined by the outer housing 200 (into the space defined between the outer housing 200 and the inner container 400). In this manner, the material held in the interior chamber 440 is dried (as compared to its original state).

The open top 430 of the inner container 400 is closed off by an inner cover member 700, as shown in FIG. 2A. The inner cover member 700 of this illustrated example releasably engages the open top 430 of the inner container 400 thereby closing the open top 430. When mounted on the perimeter rim 430P of the inner container 400 as shown in FIG. 2A, the inner cover member 700 will be fixed with respect to the inner container 400 (so that rotational force applied to the inner cover member 700 will, in turn, rotate the inner container 400 along with the inner cover member 700). This example inner cover member 700 includes two spaced ridges 700R sized and shaped to securely engage the perimeter rim 430P of the inner container 400. These ridges 700R may help keep the inner container 400 centered in the outer housing 200 and help create a secure connection between the inner container 400 and the outer cover member 300. If desired, the inner cover member 700 may include a perimeter seal (e.g., akin to seal 300S of the outer cover member 300) to sealingly engage the inner cover member 700 with the open top 430 of the inner container 400. Inner cover member 700 may be made of any desired material or materials, e.g., plastic, metal, etc.

While other structures and arrangements are possible, in the example drying device 100 shown in FIG. 2A, the inner cover member 700 includes a recessed area 710 that extends inwardly into the interior chamber 440 of the inner container 400. This recessed area 710, when and if present, may extend inwardly (downwardly) at least 10% of a height dimension H of the inner container 400. In some examples, the recessed area 710 may extend inwardly (downwardly) at least 20%, at least 25%, at least 30%, at least 35%, at least 40%, at least 45%, or even at least 50% of the height dimension H of the inner container 400. Additionally or alternatively, in some examples, the recessed area 710 may extend inwardly (downwardly) less than 90%, less than 80%, less than 70%, or even less than 60% of the height dimension H of the inner container 400.

In this example drying device 100, recessed area 710 provides a receptacle for receiving a portion of the rotation mechanism 500. The bottom 712 of the recessed area 710 in this example includes a first part 714 of a rotation producing system that interacts with a second part 514 of the rotation producing system (provided as part of rotation mechanism 500) to rotate the inner cover member 700 (and thus the connected inner container 400) with respect to the outer housing 200. These connections and operations will be described in more detail below.

Figure 2B:
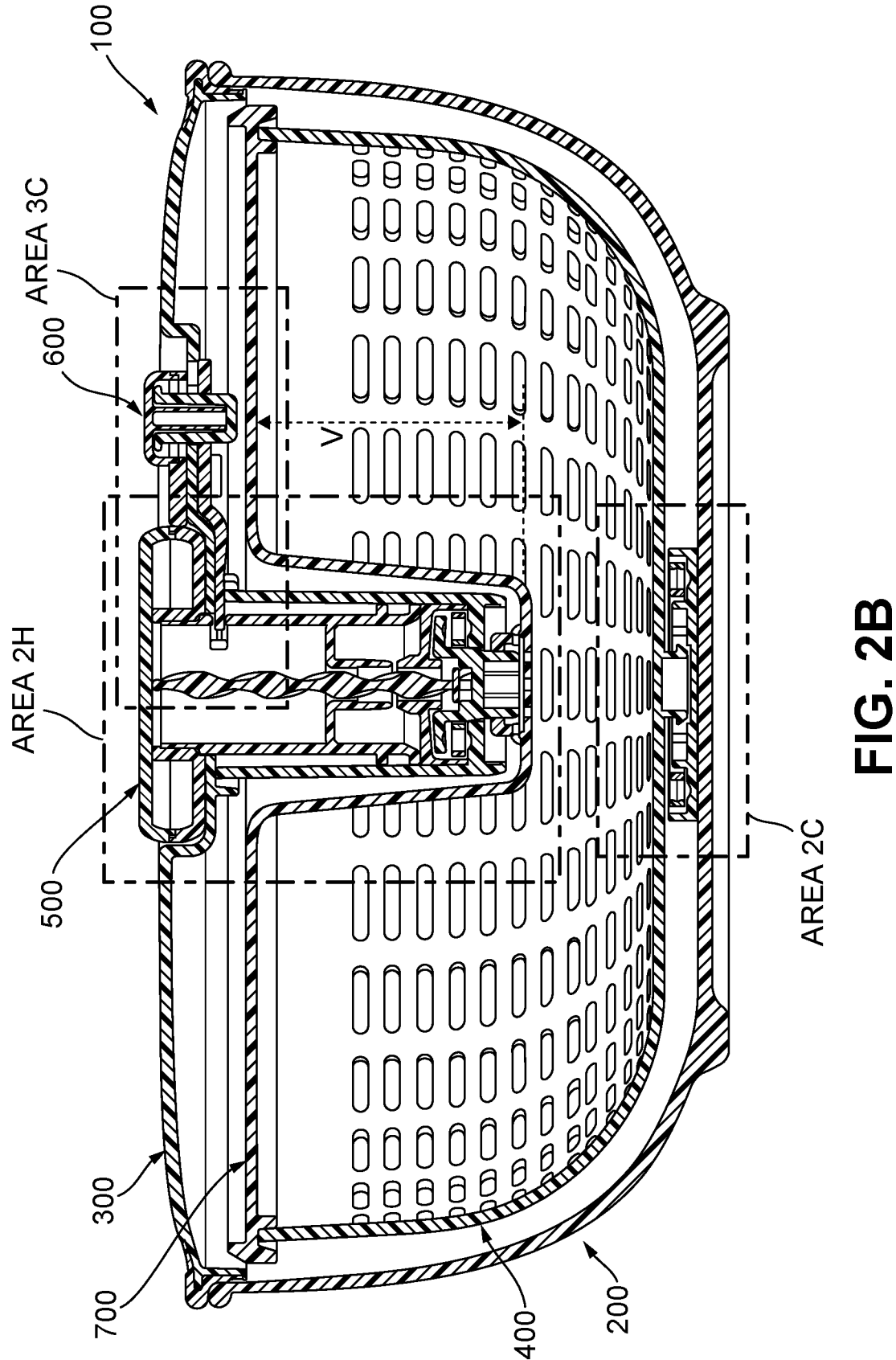

Turning now to FIG. 2B, FIG. 2B provides a cross sectional view similar to FIG. 2A. FIG. 2B identifies Area

2C, which shows a rotation supporting connection between the outer housing 200 and the inner container 400. Example rotation supporting connections will be described in more detail in conjunction with FIG. 2C, which shows an enlarged view of Area 2C of FIG. 2B. FIG. 2B further identifies Area 2H, which shows a rotation producing system for generating rotational force to be applied to inner cover member 700 (and thus to inner container 400). Example rotation producing systems and connections will be described in more detail in conjunction with FIG. 2H, which shows an enlarged view of Area 2H of FIG. 2B. Additionally, FIG. 2B identifies Area 3C, which shows a switching system for the drying device 100. Example switching system features and operations will be described in more detail in conjunction with FIG. 3C, which shows an enlarged view of Area 3C of FIG. 2B.

Figure 2C:
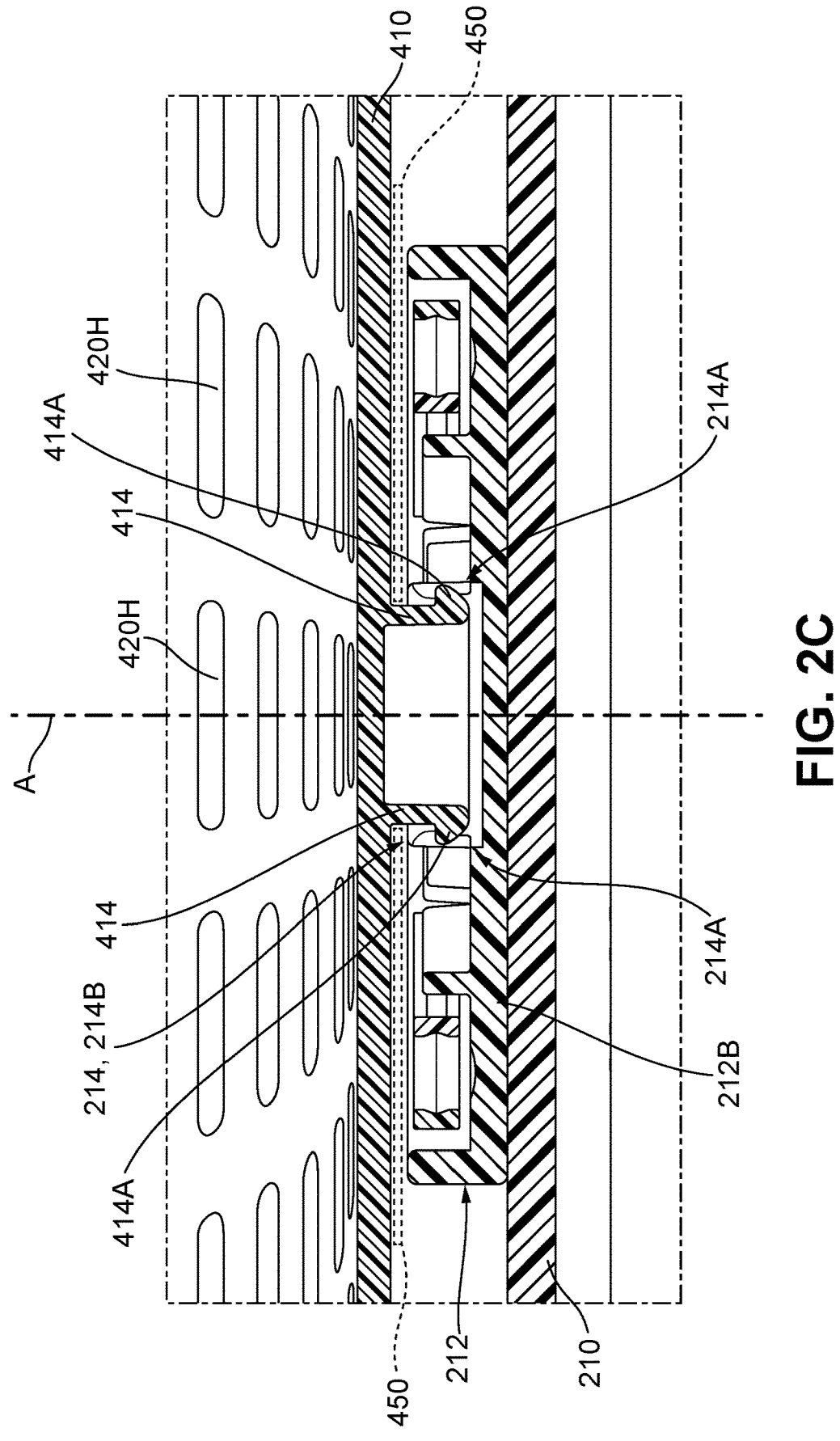
FIG. 2C provides an enlarged view of Area 2C shown in FIG. 2B.

As evident from the description above, the drying device 100 functions by rotating the inner container 400 with respect to the outer housing 200 to generate rotational force that dislodges water or other fluid from a material within interior chamber 440. That dislodged fluid moves through the holes 420H and into the interior chamber 240 between the inner container 400 and the outer housing 200. To facilitate the desired relative rotational motion, the inner container 400 must be mounted within the outer housing 200 in a manner so that the desired rotation can occur. In the example of FIG. 2C, the bottom surface 210 of the outer housing 200 is equipped with a rotary mount 212 (e.g., a turntable type structure). The rotary mount 212 may have its base 212B fixed to the bottom surface 210 of the outer housing 200. The top of the rotary mount 212 defines a receptacle 214 equipped with a rotatable support 214B. Rotatable support 214B freely rotates with respect to base 212B. The receptacle 214 includes one or more teeth or other surfaces 214A (e.g., gears, slots, recesses, etc.) configured to releasably engage a portion of the inner container 400.

As further shown in FIG. 2C, the bottom surface 410 of the inner container 400 of this example includes a projection 414 configured to extend into the receptacle 214 of the rotary mount 212. The projection 414 of this example includes one or more outwardly extending surfaces 414A that engage the teeth or other surfaces 214A provided in receptacle 214. When the one or more outwardly extending surfaces 414A of projection 414 are engaged with the one or more teeth or other surfaces 214A on rotatable support 214B, the inner container 400 will be spaced apart from the outer housing 200 at locations other than projection 414. Also, the inner container 400 will be rotatable with respect to the outer housing 200 because rotatable support 214B is rotatable with respect to fixed base 212B. If necessary or desired, the outer housing 200 and/or inner container 400 may be equipped with a release mechanism to allow projection(s) 414 to be easily removed from receptacle 214. In other examples, however, a friction fit between projection(s) 414 and receptacle 214 may be used.

A wide variety of relatively rotatable connections may be provided between (e.g., at the bottom) of inner container 400 and outer housing 200 without departing from this technology. For example, the structures shown in FIG. 2C could be vertically inverted such that the outer housing 200 includes the male connector component (e.g., projection(s) 414) and the inner container 400 includes the female connector component (e.g., receptacle 214). A wide variety of conventionally known rotatable hardware connectors may be used to provide this relative rotation without departing from this technology.

As another alternative, if desired, the bottom surface 410 of the inner container 400 may include a protective layer 450, e.g., a flat silicone disk, as shown in broken lines in FIG. 2C. The protective layer 450 can help prevent scratches or other damage from forming on the bottom surface 410 of the inner container 400, e.g., if the bottom surface 410 of the inner container 400 comes in contact with the rotary mount 212 (or other structures), which may occur as rotation of the inner container 400 slows and/or if the load in the inner container 400 is off balance. This protective layer 450, when present, may be fixed to the bottom surface 410 (e.g., by adhesives, by mechanical connectors, etc.), or it may be releasably attached (e.g., by releasable mechanical connectors, by friction fit structures, etc.).

FIGS. 2D-2G show features of an alternative bottom structure for the inner container 400 that may be used in at least some examples of this technology. FIG. 2D shows a bottom view of a turntable mount 460 that may be provided at the central bottom surface 410 of an inner container 400 (e.g., integrally formed with the inner container 400 by molding, attached as a separate part, etc.). This turntable mount 460 may include the projections 414 (optionally with outwardly extending surfaces 414A), e.g., for engaging a rotary mount 212 as described above in conjunction with FIGS. 2B and 2C.

FIG. 2D further shows that this example turntable mount 460 includes one or more recesses 462 (four recesses 462 shown in this specifically illustrated example) located outside the projections 414. The recess(es) 462 is (are) provided to engage corresponding projection(s) 464 provided on the top surface 452T of protective element 450A as shown in FIG. 2E. The protective element 450A may constitute a silicone material (e.g., a flat silicone disk), e.g., to help prevent scratches or other damage from forming on the bottom surface 410 of the inner container 400. If desired, the protective element 450A may be made from a material that may assist in slowing rotation of the inner container 400 with respect to the outer housing 200.

This example protective element 450A additionally includes through holes 466 through which the projections 414 extend (to enable them to engage the rotary mount 212). FIG. 2F illustrates the protective element 450A mounted on the turntable mount 460 with the projections 414 extending through the through holes 466 of the protective element 450. This mounting may be a friction fit and/or releasable connection (e.g., with bulbous ends of the projections 464 retained within the smaller sized opening(s) to the recess(es) 462) or it may be a more permanent fixed mount (e.g., fixed by adhesives, etc.). FIG. 2F shows the exposed bottom surface 452B of the protective element 450A (which is opposite the top surface 452T shown in FIG. 2E). FIG. 2G shows the bottom of the inner container 400 with this turntable mount 460 and protective element 450A provided on it. Projections 414 extend through the through holes 466 of the protective element 450A and are exposed to engage the rotary mount 212 (e.g., as described above in conjunction with FIGS. 2B and 2C).

As another example, the bottom surface 210 of the outer housing 200 may be smooth or include a small recess and the bottom surface 410 of the inner container 400 may include a relatively small and/or pointed downwardly extending projection that can spin on the bottom surface 210 of the outer housing 200 (e.g., in the manner that a toy top spins on a surface). As another example, the bottom surface 210 of the outer housing 200 may include a relatively small and/or pointed upwardly extending projection and the bottom surface 410 of the inner container 400 may be smooth or include a small recess that can receive the projection. In this manner, the inner container 400 can spin on the projection provided on the bottom surface 210 of the outer housing 200. Other relatively rotatable connection structures and/or hardware also may be used.

Figure 2H:
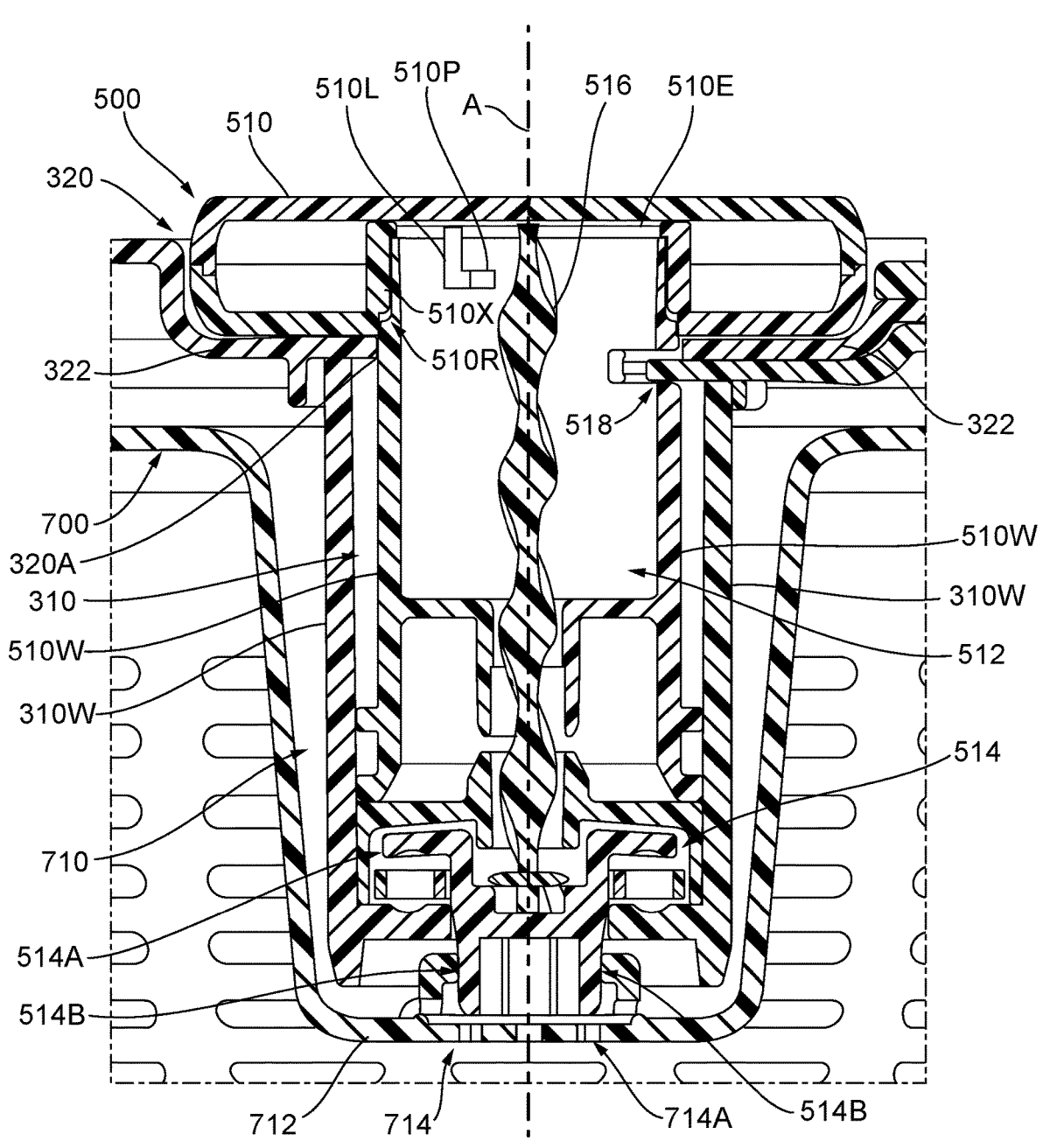
FIG. 2H provides an enlarged view of Area 2H shown in FIG. 2B.
Figure 2I:
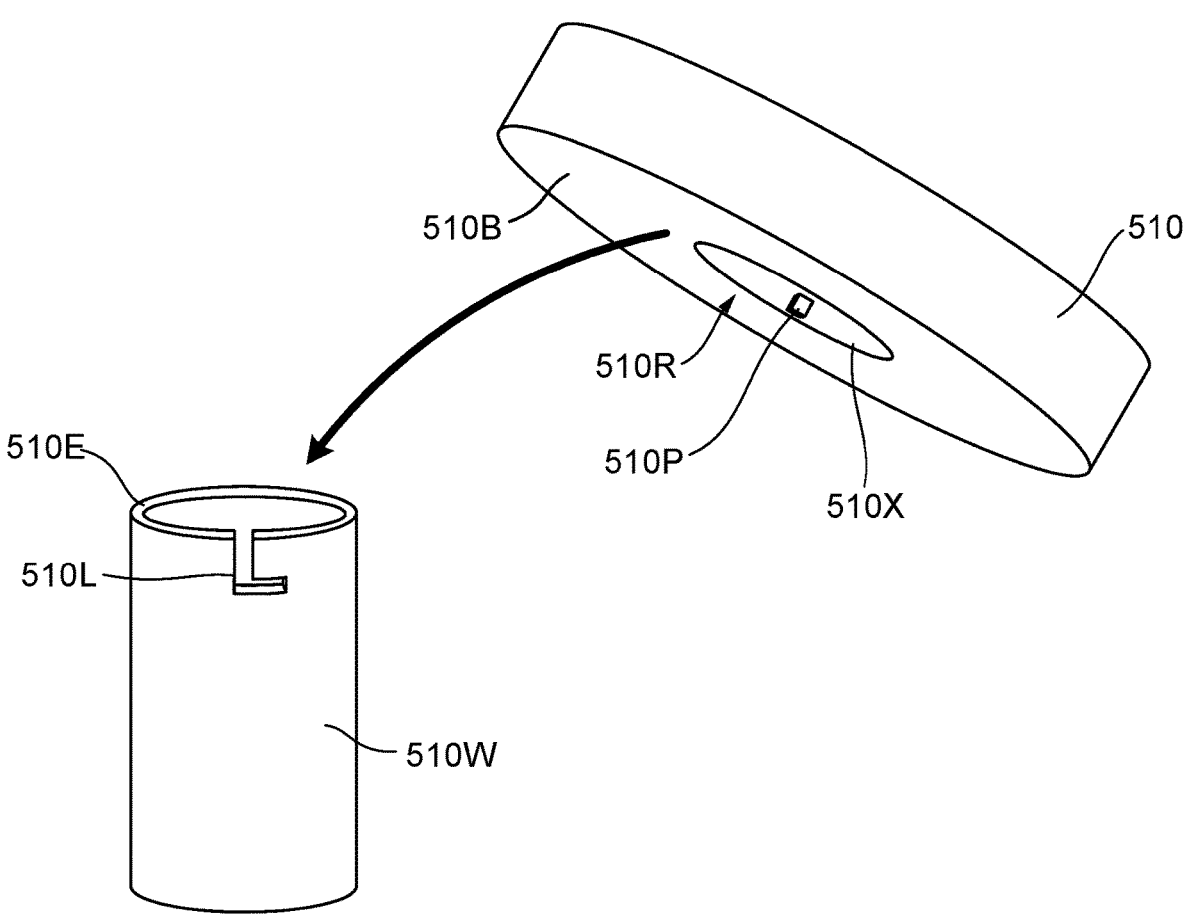
FIG. 2I illustrates features of an example connection between the pump handle and pump wall of drying devices according to some examples of this technology.

Turning now to FIG. 2H, additional features of an example rotation mechanism 500 and parts of a rotation producing system will be described. In this illustrated example, the rotation mechanism 500 includes a spiral plunger to provide the rotational force. The rotation mechanism 500 extends into a recessed area 310 defined in the outer cover (by recess wall(s) 310W). The recessed area 310 extends into the recessed area 710 defined by the inner cover member 700.

The rotation mechanism 500 includes pump handle 510 exposed at the outside of the outer cover member 300. Pump wall 510W forms a base portion of the rotation mechanism 500 that extends through opening 320A of the outer cover member 300 and defines a chamber 512 into which the spiral plunger 516 extends. The top of the spiral plunger 516 is attached to and moves with the pump handle 510. The pump handle 510 is configured to move vertically in the axial direction A into and out of the opening 320A. As further shown in FIG. 2H, the base portion of the rotation mechanism (e.g., pump wall 510W) that extends through the opening 320A of the outer cover member 300 includes a side surface having a recess 518 defined therein. The recess 518 may comprise a blind hole or recess or, as shown in FIG. 2H, may comprise a through hole opening that extends into chamber 512 of the base portion of the rotation mechanism 500.

The pump handle 510 may be permanently fixed to the pump wall 510W (which forms a shaft of the rotation mechanism 500), or the pump handle 510 and pump wall 510W may be releasably engaged together. As one more specific example, referring to FIG. 2H and FIG. 2I, the top edge 510E of the pump wall 510W may include one or more L-shaped grooves 510L defined in it. A wall 510X defining an interior recess 510R on the bottom 510B of the pump handle 510 may include one or more projecting elements 510P configured to extend into and slide within the L-shaped grooves 510L of the pump wall 510W. Sliding the projecting element(s) 510P down the corresponding L-shaped groove(s) 510L and then a slight twisting action can fix the pump handle 510 to the pump wall 510W. This engagement can help prevent the pump handle 510 from dislodging from the pump wall 510W e.g., when the pump handle 510 is unlocked.

As described above, the bottom 712 of the recessed area 710 of the inner cover member 700 of this example includes a first part 714 of a rotation producing system. This first part 714 interacts with a second part 514 of the rotation producing system (provided as part of rotation mechanism 500) to rotate the inner cover member 700 (and thus the connected inner container 400) with respect to the outer housing 200. The first part 714 of the rotation producing system in this example includes one or more recesses and/or through hole openings 714A defined in the bottom 712 of the inner cover member 700 (e.g., at the bottom of the recessed area 710 of the inner cover member 700). The second part 514 of the rotation producing system in this example includes a coupler 514A having one or more teeth 514B capable of extending into the one or more recesses and/or through hole openings 714A defined in the bottom 712 of the inner cover member 700.

In use, this example rotation producing system operates as follows. Downward force applied to the pump handle 510 causes the spiral plunger 516 to move downward, which, in turn, causes the coupler 514A to rotate and move downward.

This downward force, in turn, moves the one or more teeth 514B into the one or more recesses and/or through hole openings 714A on the bottom 712 of the inner cover member 700. The rotation of the coupler 514A causes the inner cover member 700 to rotate, which, in turn, causes the inner container 400 to rotate. This rotation causes water or other fluid to dislodge from the material in the interior chamber 440 of the inner container 400 and out through holes 420H.

Upward force applied to the pump handle 510 causes the spiral plunger 516 to move upward, which, in turn, causes the coupler 514A's one or more teeth 514B to dislodge from the one or more recesses and/or through hole openings 714A. Because the coupler 514A dislodges from the inner cover member 700, the inner container 400 can continue to spin as the pump handle 510 moves upward in preparation for another downward pump stroke.

An example switch device 600 in accordance with some aspects of this technology now will be described in conjunction with FIGS. 3A-3C. FIGS. 3A and 3B show exploded views of this example switch device 600 in an unlocked configuration (FIG. 3A) and in a locked configuration (FIG. 3B). FIG. 3C provides an enlarged cross sectional view of the switch device 600 and its engagement with the rotation mechanism 500.

The switch device 600 of this example includes a button 610 mounted at the second support region 330 of the outer cover member 300 (e.g., in the recessed slot 332). Specifically, a portion 610A of the button 610 (e.g., a shaft member or sidewall) extends through the second support region opening 330A of the outer cover member 300. This switch device 600 has a dual function. One function is a braking function. Pressing this button 610 vertically (see arrow Z in FIG. 3C) moves a braking surface 620 (e.g., located at a bottom of the switch device 600) to engage, slow, and eventually stop the inner cover member 700 from rotating (which thereby slows and stops rotation of the inner container 400 with respect to the outer housing 200). The other function is a rotation mechanism 500 locking function. Sliding this button 610 laterally in the recessed slot 332 (see arrow X in FIG. 3C) moves a lock member 630 (also called a "lock arm" herein) to engage the rotation mechanism 500 and switch it between an unlocked configuration (FIG. 3A) and a locked configuration (FIGS. 3B and 3C).

As shown in FIGS. 3A-3C, the switch device 600 includes a button 610, e.g., formed from a thermoplastic elastomer material. This example button 610 includes forward and rearward extending portions 610B (e.g., formed from polypropylene) that fit over and cover the opening 330A when the button 610 is in the unlocked and locked configurations. The forward and rearward extending portions 610B slide along and engage the top surface 332A of the recessed slot 332. The center of the button 610 includes an exteriorly exposed surface 610C for the user to engage to use the button 610 and switch device 600. The center button surface 610C may constitute a thermoplastic elastomer overmold that attaches to another button part (e.g., a button part that includes the forward and rearward extending portions 610B and/or a button part that engages button portion 610A).

The button 610 engages with the button portion 610A (e.g., formed from polyoxymethylene (POM)) that extends through the opening 330A of the outer cover member 300. Alternatively, if desired, two or more of the button parts 610A, 610B, and/or 610C may be formed as a single part (e.g., by molding techniques). Button portion 610A includes braking surface 620 at its bottom. Vertically pressing the button 610 (see arrow Z in FIG. 3C) downwardly with sufficient force moves the braking surface 620 downward and into contact with the inner cover member 700 (e.g., into contact with the top surface 700S of inner cover member 700). Continued pressing of the button 610 will slow and eventually stop the inner cover member 700 from rotating, which thereby stops rotation of the inner container 400 with respect to the outer housing 200. In this manner, button 610 and switch device 600 act as a rotation braking system.

The button portion 610A engages lock member 630 (e.g., a lock lever made from POM), and these parts may be fixed together. Button portion 610A may extend through an opening 630A (a lock arm opening) provided in the lock member 630. Button portion 610A may include a shaft member or sidewall that extends through the lock member opening 630A (and the braking surface 620 discussed above may be provided at the free end of that shaft member or sidewall, e.g., as shown in FIGS. 3A-3C). When the switch device 600 is in the unlocked configuration with the button 610 slid laterally away from the rotation mechanism 500 (e.g., and located at or near the rear wall 332R of recessed slot 332), the free end 630E is located away from the rotation mechanism 500. See FIG. 3A.

In the locked configuration shown in FIGS. 3B and 3C, however, the button 610 is slid laterally toward the rotation mechanism 500 (e.g., and located at or near the handle 510 of the rotation mechanism 500). In this configuration, the lock member 630 extends beneath the second support region 330 of the outer cover member 300, and a free end 630E of the lock member 630 engages the base portion (e.g., pump wall 510W) of the rotation mechanism 500 to place the rotation mechanism 500 in the locked configuration. In this specifically illustrated example, the free end 630E of the lock member 630 extends into the recess 518 in the pump wall 510W. The presence of the free end 630E of the lock member 630 in the recess 518 prevents the pump wall 510W from moving upward because the top edge 518E of the recess 518 abuts the lock member 630 near the free end 630E. In this manner, the handle 510 is locked in the downward position. Additionally or alternatively, if desired, recess(es) 518 may be provided in one or more other locations along the axial length of the pump wall 510W, e.g., to enable the pump handle 510 to be locked at other (or another) vertical position (e.g., including locked in a fully upward extended location).

As shown in FIG. 3C, in this illustrated example structure, the lock member 630 includes: (i) a portion that includes the lock member opening 630A (e.g., an outer portion), (ii) a portion that extends under the recessed slot 332 of the second support region 330 of the outer cover member 300 (e.g., an intermediate portion), and (iii) a portion that includes free end 630E and extends under the recessed surface 322 of the first support region of the outer cover member 300 (e.g., in inner portion). The lock member 630 of this example further extends upward between the inner portion and the intermediate portion (see area 640 in FIG. 3C). The shape (e.g., curvature) of the upper surface of the lock member 630 at area 640 may correspond to the shape (e.g., curvature) of the lower surface of the outer cover member 300 at area 340. When in the locked position, as shown in FIG. 3C, the upper surface of the lock member 630 at area 640 may abut the lower surface of the outer cover member 300 at area 340, e.g., to provide a slider stop for lateral motion of switch device 600.

As evident from FIG. 3C, in this illustrated example, the top surface 700S of the inner cover member 700 and the braking surface 620 are sized and shaped such that the braking surface 620 is capable of engaging (e.g., contacting) the top surface 700S of the inner cover member 700 when the button 610 is in both the locked position (as shown in FIG. 3C) and in the unlocked position (e.g., slid rightward from the view shown in FIG. 3C). Thus, force can be applied to slow and/or stop rotation of the inner cover member 700 (and the inner container 400 engaged with it) irrespective of whether the rotation mechanism 500 is locked or unlocked.

In at least some examples of this technology, the inner cover member 700 defines (at least) two areas that transfer forces to the inner container 400 to which it is releasably fixed: (i) the first part 714 of the rotation producing system (which interacts with the second part 514 of the rotation producing system to transfer rotational force to the inner container 400) and (ii) a top surface 700S (which interacts with the braking surface 620 of the switch device 600 to transfer braking force to the inner container 400). The top surface 700S of the inner cover member 700 at the locations that interact with the braking surface 620 may be vertically offset or separated from the bottom 712 of the recessed area 710 (wherein the first part 714 of the rotation producing system is located) by a separation distance V (see FIG. 2B). In at least some examples of this technology, this vertical separation distance V may extend at least 20%, at least 25%, at least 30%, at least 35%, at least 40%, at least 45%, or even at least 50% of the height dimension H of the inner container 400 (shown in FIG. 2A). Additionally or alternatively, in some examples, this vertical separation distance V may extend less than 90%, less than 80%, less than 70%, or even less than 60% of the height dimension H of the inner container 400.

Figure 4A:
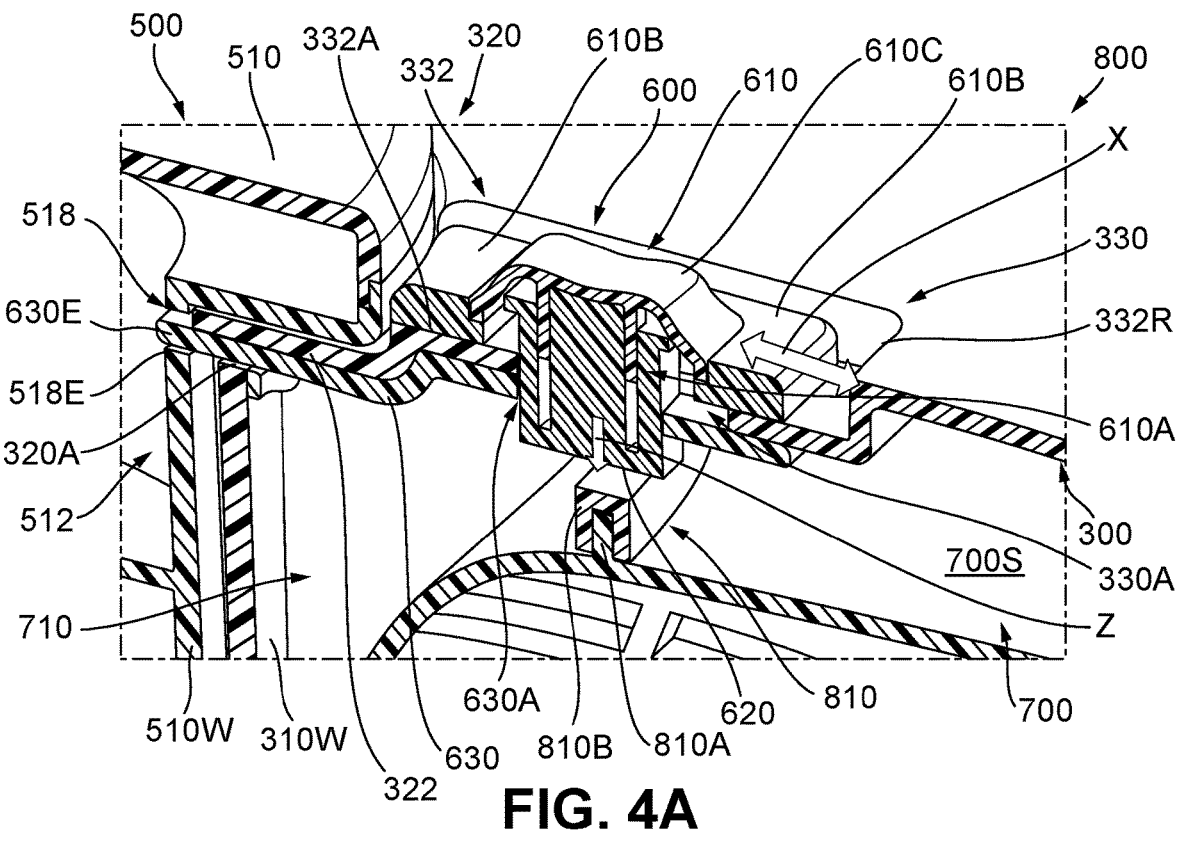
FIGS. 4A and 4B show views of an alternative switch device and braking system in accordance with some aspects of this technology.
Figure 4B:
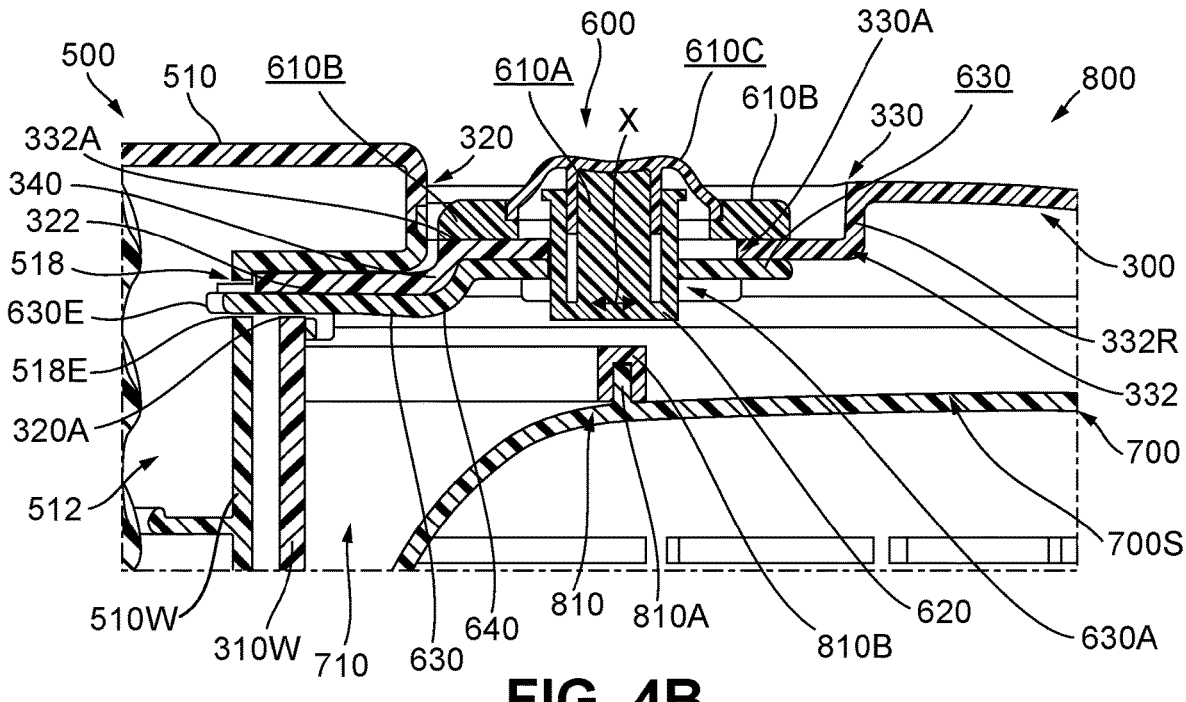

FIGS. 4A and 4B illustrate another example drying device 800 structure in accordance with some aspects of this technology. Where the same reference numbers are used in FIGS. 4A and 4B as are used in FIGS. 1A-3C, the same or similar parts are being referenced (with any of the variations and/or options described above for those parts), and much of the repetitive description may be omitted. The following discussion of FIGS. 4A and 4B focuses primarily on at least some differences between drying device 800 (and its individual parts) and the drying devices 100 (and their individual parts) described above in conjunction with FIGS. 1A-3C.

As shown in FIGS. 4A and 4B, the top surface 700S of the inner cover member 700 in this example drying device 800 includes a raised ridge 810. While other arrangements are possible, in this illustrated example, the raised ridge 810 is located at an upper portion of the inner cover member 700 and generally defines the entry into the downwardly extending recessed area 710 of the inner cover member 700 (which receives the outer cover member 300's recessed area 310 and a portion of the rotation mechanism 500). This raised ridge 810 is configured to engage the braking surface 620 of the button 610 when the button 610 is pressed with sufficient force (in the Z direction) to activate the braking function, as described above. The raised ridge 810 may help stiffen the inner cover member 700 structure somewhat to enable more reliable braking and/or may reduce the vertical distance the button 610 must be displaced to activate braking).

FIGS. 4A and 4B show that this example raised ridge 810 has a two part construction. An interior rib 810A is integrally formed with the top surface 700S of the inner cover member 700 from the base material of the inner cover member 700, e.g., during a process of molding the inner cover member 700. An outer cover 810B is applied to cover at least a portion (e.g., at least the top surface) of the interior rib 810A. In some examples, the outer cover 810B may form a sheath that substantially completely covers the interior rib 810A. The outer cover 810B may be made an elastomeric material (e.g., a rubber or soft thermoplastic polymer material) or any material having a relatively high coefficient of friction with respect to the material forming the braking surface 620.

As further evident from FIG. 4B, in this illustrated example, a surface area of the braking surface 620 is sufficient (e.g., the braking surface 620 has sufficient width in the X direction) such that the braking surface 620 is capable of engaging (e.g., contacting) the raised ridge 810 when the button 610 is in both the locked position (as shown in FIG. 4B) and in the unlocked position (e.g., slid rightward from the view shown in FIG. 4B). Thus, braking force can be applied to slow and/or stop rotation of the inner cover member 700 (and the inner container 400 engaged with it) irrespective of whether the rotation mechanism 500 is locked or unlocked. When the button 610 is in the locked position and braking force is applied to it, a first portion of the braking surface 620 will engage the raised ridge 810. But, when the button 610 is in the unlocked position and braking force is applied to it, a second and different portion of the braking surface 620 will engage the raised ridge. While these engaging first and second portions of the braking surface 620 may partially overlap, they are not identical in this example of this technology.

Thus, as evident from the discussion above, the switch device 600 in accordance with aspects of this technology (e.g., in drying devices 100, 800) includes a single button 610 configured to perform dual functions. The button 610 includes a portion 610A (e.g., a shaft or sidewall portion) that extends in the Z direction (see FIG. 3C). The bottom of that portion 610A includes the braking surface 620 (e.g., which may be made from or include an elastomeric material (e.g., a rubber or soft thermoplastic polymer material) or any material having a relatively high coefficient of friction with respect to the material forming the inner cover member 700 and/or the material of the raised ridge 810 (when a raised ridge 810 is present)). These structures and actions allow the button 610 to perform the braking function (slowing and/or stopping rotation of inner cover member 700 and inner container 400 with respect to the outer housing 200). That same portion 610A of the single button 610 engages the lock member 630 (e.g., through an opening 630A formed in the lock member 630). Transverse sliding motion (e.g., in the X direction of FIG. 3C) of that same portion 610A of the single button 610 moves lock member 630 to lock or unlock the rotation mechanism 500 (by engaging the lock member 630 with a portion (e.g., a recess 518 in a pump wall 510W of rotation mechanism 500). These structures and actions allow that same single button 610 to perform the rotation mechanism 500 locking and unlocking functions.

In the example drying device 100, 800 structures shown in FIGS. 1A-4B, the rotation mechanism 500 may be equipped with a biasing member that applies a force pushing the pump handle 510 and its connected parts (e.g., the base portion's pump wall 510W, the spiral plunger 516, etc.) upward. When the lock member 630 is in the unlocked position (outside of recess 518), the biasing member (e.g., one or more springs, one or more expandable foam components, etc.) may push the pump handle 510 upward, making it somewhat easier for the user to grasp. When the lock member 630 is in the locked position (with lock member 630 free end 630E extending into the recess 518), contact between the pump wall 510W at recess top edge 518E and the lock member 630 will overcome the biasing force to lock the pump handle 510 in the downward position.

Additionally or alternatively, if desired, the exposed surface of the pump handle 510 may include a hand grip, e.g., attached to the pump handle 510 and/or integrally formed as part of the pump handle 510, to make it easier for the user to grab and lift the pump handle 510W when it is in the downward position. The hand grip, when present, may take on various forms, such as a knob, a ring, a raised rib, a recessed groove, etc.

FIGS. 1A-4B illustrate drying devices 100, 800 in which the rotation mechanism 500 includes a spiral plunger 516 that functions to induce spin of the inner cover member 700 and inner container 400 with respect to the outer housing 200. Other rotation mechanisms 500 may be used in other examples of this technology. For example, rather than a vertical pumping action (using spiral plunger 516) moving in the axial direction (with pump handle 510 and pump wall 510W moving vertically into and out of recess wall(s) 310W), the rotation mechanism 500 may create rotary motion by rotating handle 510 and wall 510W around axis A within stationary recess wall 310W. In such a structure, the handle 510 may include a crank, one or more recesses, a handle, etc., to enable the user to apply rotation motion about axis A to the handle 510. Thus, the pump handle 510 and spiral plunger 516 of FIGS. 1A-4B could be replaced by a rotary handle that allows a user to directly rotate wall 510W about the axial direction A within the opening 320A (e.g., such that wall 510W rotates with respect to recess wall(s) 310W provided in the outer cover member 700). In such a rotation mechanism, a clutch or ratchet system could be provided to enable the inner cover member 700 and inner container 400 to continue rotating under inertial forces even after the user has stopped applying rotational force to the crank handle 510. The lock member 630 may engage a recess defined in the side wall 510W of this type of rotatable crank handle 510, e.g., in a similar manner to the free end 630E/recess 518 engagement described above.

The specific example drying devices 100, 800 described above include structures in which rotational force and braking force are applied indirectly to the inner container 400 by rotational force and braking force applied to an inner cover member 700 (which may be releasably fixed to an open top 430 of the inner container 400). Braking force and/or relative rotational force may be applied to the inner container 400 in other manners as well. For example, the inner cover member 700 could be omitted from a drying device and the bottom surface 410 of the inner container 400 could be equipped with: (i) the first part of the rotation producing system (e.g., structure akin to first part 714 provided at the bottom surface 710 of the inner cover member 700) and (ii) a brake engaging surface to engage braking surface 620. Optionally, in such structures, the first part of the rotation producing system and the brake engaging surface provided with the inner container 400 could be provided on a raised structure extending upward within the inner container 400 toward the bottom of the rotation mechanism 500 and toward the braking surface 620. Other ways of directly or indirectly applying rotational force and/or braking force to the inner container 400 also may be used in other examples of this technology.

FIGS. 1A-4B further show the assembled drying devices 100, 800 and their individual parts as having specific visual appearances. These specifics are simply examples. The drying devices 100, 800 may take on a wide variety of sizes, shapes, and aesthetic appearances without departing from the technology disclosed herein. For examples, the outer housing 200 may have a wide variety of sizes, volumes, exterior wall shapes, interior chamber 240 shapes, etc., without departing from the technology disclosed herein. Similarly, the outer cover member 300 may have a wide variety of sizes; shapes; thicknesses; recessed area 310 sizes and/or shapes; support region 320 sizes and/or shapes; support region 330 sizes and/or shapes; etc., without departing from the technology disclosed herein. The inner container 400 may have a wide variety of sizes; volumes; exterior wall shapes; interior chamber 440 shapes; hole 420H sizes, shapes, and/or arrangement patterns; etc., without departing from the technology disclosed herein. The rotation mechanism 500 may have a wide variety of sizes; shapes; pump handle 510 sizes and shapes; functional designs; etc. without departing from the technology disclosed herein. The switch device 600 may have a wide variety of sizes; shapes; button 610 sizes, shapes, and/or positions; functional designs; etc. without departing from the technology disclosed herein. The inner cover member 700 may have a wide variety of sizes; shapes; thicknesses; recessed area 710 sizes and/or shapes; etc., without departing from the technology disclosed herein. Further, many structural and/or functional changes (e.g., the manner in which the various parts appear, function, and/or interact with one another) may vary widely without departing from this technology.

The present invention is disclosed above and in the accompanying drawings with reference to a variety of example structures. The purpose served by the disclosure, however, is to provide examples of the various features and concepts related to the invention, not to limit the scope of the invention. One skilled in the relevant art will recognize that numerous variations and modifications may be made to the embodiments described above without departing from the scope of the present invention, as defined by the appended claims.

The invention claimed is:

1. A food drying device, comprising:
an outer housing including a first open top and defining a first interior chamber;
an inner container rotatably supported within the first interior chamber, the inner container including a perforated container wall and defining an inner container chamber;
an outer cover member closing the first open top, the outer cover member including: (i) a first support region having a first opening defined therethrough, and (ii) a second support region having a second opening defined therethrough;
a rotation mechanism configured to apply a rotational force to rotate the inner container with respect to the outer housing, the rotation mechanism including a portion extending through the first opening of the outer cover member; and
a switch device including: (i) a button member having a portion extending through the second opening of the outer cover member, (ii) a braking surface movable by a pressing force applied to the button member to apply a braking force to the inner container, and (iii) a lock member extending laterally in a direction away from the button member, the lock member being movable by a sliding force applied to the button member to switch the rotation mechanism between a locked configuration in which the lock member prevents activation of the rotation mechanism and an unlocked configuration in which the lock member permits activation of the rotation mechanism.

2. The food drying device according to claim 1, wherein the first support region is located in a center region of the outer cover member and the second support region extends laterally sideways from the first support region.

3. The food drying device according to claim 1, wherein the second support region includes a recessed slot, and wherein the switch device is mounted within the recessed slot such that at least an outer portion of the button member is exposed and slidable within the recessed slot between: (i) a locked position in which the rotation mechanism is in the locked configuration and (ii) an unlocked position in which the rotation mechanism is in the unlocked configuration.

4. The food drying device according to claim 1, wherein the lock member of the switch device includes a lock arm that extends beneath the second support region of the outer cover member, and wherein a first end of the lock arm engages the portion of the rotation mechanism extending through the first opening of the outer cover member to place the rotation mechanism in the locked configuration.

5. The food drying device according to claim 4, wherein the lock arm includes a lock arm opening defined therethrough, wherein the portion of the button member extending through the second opening of the outer cover member includes a shaft member that extends through the lock arm opening, and wherein the braking surface is provided at a free end of the shaft member.

6. The food drying device according to claim 5, further comprising an inner cover member engaged with the inner container, wherein a top surface of the inner cover member includes a raised ridge, and wherein the braking surface of the switch device is configured to move to engage the raised ridge when sufficient pressing force is applied to the button member to thereby apply the braking force to the inner container.

7. The food drying device according to claim 1, further comprising an inner cover member engaged with the inner container, wherein a top surface of the inner cover member includes a raised ridge, and wherein the braking surface of the switch device is configured to move to engage the raised ridge when sufficient pressing force is applied to the button member to thereby apply the braking force to the inner container.

8. The food drying device according to claim 7, wherein the switch device is mounted to the outer cover member such that at least an outer portion of the button member is exposed and slidable with respect to the outer cover member between: (i) a locked position in which the rotation mechanism is in the locked configuration and (ii) an unlocked position in which the rotation mechanism is in the unlocked configuration, and wherein a surface area of the braking surface is sufficient such that the braking surface is configured to engage the raised ridge when the button member is in the locked position and when the button member is in the unlocked position.

9. The food drying device according to claim 1, further comprising an inner cover member engaged with the inner container, wherein the switch device is mounted to the outer cover member such that at least an outer portion of the button member is exposed and slidable with respect to the outer cover member between: (i) a locked position in which the rotation mechanism is in the locked configuration and (ii) an unlocked position in which the rotation mechanism is in the unlocked configuration, and wherein the braking surface is configured to engage a top surface of the inner cover member to thereby apply the braking force to the inner container when the button member is in the locked position and when the button member is in the unlocked position.

10. A food drying device, comprising:
an outer housing including a first open top and defining a first interior chamber;

an inner container rotatably supported within the first interior chamber, the inner container including a perforated container wall and a second open top and defining a second interior chamber;
an inner cover member closing the second open top, the inner cover member including a first part of a rotation producing system that rotates the inner container with respect to the outer housing;
an outer cover member closing the first open top, the outer cover member including: (i) a first support region having a first opening defined therethrough, and (ii) a second support region having a second opening defined therethrough;
a rotation mechanism including: (i) a base portion extending through the first opening of the outer cover member, the base portion including a side surface having a recess defined therein, and (ii) a second part of the rotation producing system engagable with the first part of the rotation producing system; and
a switch device including: (i) a button member having a portion extending through the second opening of the outer cover member, (ii) a braking surface movable by a pressing force applied to the button member to engage the inner cover member, and (iii) a lock member extending laterally in a direction away from the button member, the lock member being movable by a sliding force applied to the button member to switch the rotation mechanism between a locked configuration in which the lock member extends into the recess defined in the base portion and an unlocked configuration in which the lock member is located outside of the recess.

11. The food drying device according to claim 10, wherein the first support region is located in a center region of the outer cover member and the second support region extends laterally sideways from the first support region.

12. The food drying device according to claim 10, wherein the second support region includes a recessed slot, and wherein the switch device is mounted within the recessed slot such that at least an outer portion of the button member is exposed and slidable within the recessed slot between: (i) a locked position in which the rotation mechanism is in the locked configuration and (ii) an unlocked position in which the rotation mechanism is in the unlocked configuration.

13. The food drying device according to claim 10, wherein the lock member of the switch device includes a lock arm that extends beneath the second support region of the outer cover member, and wherein a first end of the lock arm includes a lock lever that extends into the recess to place the rotation mechanism in the locked configuration.

14. The food drying device according to claim 13, wherein the lock arm includes a lock arm opening defined therethrough, wherein the portion of the button member extending through the second opening of the outer cover member includes a shaft member that extends through the lock arm opening, and wherein the braking surface is provided at a free end of the shaft member.

15. The food drying device according to claim 14, wherein a top surface of the inner cover member includes a raised ridge, and wherein the braking surface of the switch device is configured to move to engage the raised ridge when sufficient pressing force is applied to the button member.

16. The food drying device according to claim 15, wherein the switch device is mounted to the outer cover member such that at least an outer portion of the button member is exposed and slidable with respect to the outer cover member between: (i) a locked position in which the rotation mechanism is in the locked configuration and (ii) an unlocked position in which the rotation mechanism is in the unlocked configuration, and wherein a surface area of the braking surface is sufficient such that the braking surface is configured to engage the raised ridge when the button member is in the locked position and when the button member is in the unlocked position.

17. The food drying device according to claim 10, wherein a top surface of the inner cover member includes a raised ridge, and wherein the braking surface of the switch device is configured to move to engage the raised ridge when sufficient pressing force is applied to the button member.

18. The food drying device according to claim 17, wherein the switch device is mounted to the outer cover member such that at least an outer portion of the button member is exposed and slidable with respect to the outer cover member between: (i) a locked position in which the rotation mechanism is in the locked configuration and (ii) an unlocked position in which the rotation mechanism is in the unlocked configuration, and wherein a surface area of the braking surface is sufficient such that the braking surface is configured to engage the raised ridge when the button member is in the locked position and when the button member is in the unlocked position.

19. The food drying device according to claim 10, wherein the switch device is mounted to the outer cover member such that at least an outer portion of the button member is exposed and slidable with respect to the outer cover member between: (i) a locked position in which the rotation mechanism is in the locked configuration and (ii) an unlocked position in which the rotation mechanism is in the unlocked configuration, and wherein the braking surface is configured to engage a top surface of the inner cover member when the button member is in the locked position and when the button member is in the unlocked position.

20. A food drying device, comprising:

an outer housing including a bottom surface, at least one sidewall extending from the bottom surface, and a first open top, the outer housing defining a first interior chamber;

an inner container releasably and rotatably supported by the bottom surface of the outer housing and received within the first interior chamber, the inner container including: (i) a container wall spaced inward from and rotatable within the at least one sidewall of the outer housing, the container wall having a plurality of holes extending therethrough, and (ii) a second open top, wherein the inner container defines a second interior chamber;

an inner cover member releasably engaging and closing the second open top, the inner cover member including a first part of a rotation producing system that rotates the inner container with respect to the outer housing;

an outer cover member releasably engaging and closing the first open top, the outer cover member including: (i) a first support region having a first opening defined therethrough, and (ii) a second support region having a second opening defined therethrough;

a rotation mechanism including: (i) a base portion extending through the first opening of the outer cover member, the base portion including a side surface having a recess defined therein, and (ii) a second part of the rotation producing system engagable with the first part of the rotation producing system; and a switch device including: (i) a button member having a portion extending through the second opening of the outer cover member, (ii) a braking surface movable by a pressing force applied to the button member to engage the inner cover member, and (iii) a lock member extending laterally in a direction away from the button member, the lock member being movable by a sliding force applied to the button member to switch the rotation mechanism between a locked configuration in which the lock member extends into the recess defined in the base portion and an unlocked configuration in which the lock member is located outside of the recess.

* * * * *